US012298520B2

(12) United States Patent
Ikeda et al.

(10) Patent No.: US 12,298,520 B2
(45) Date of Patent: May 13, 2025

(54) HEAD-MOUNTED DISPLAY APPARATUS, OPTICAL UNIT, AND MANUFACTURING METHOD OF OPTICAL UNIT

(71) Applicant: SEIKO EPSON CORPORATION, Tokyo (JP)

(72) Inventors: Takuya Ikeda, Shiojiri (JP); Toshiaki Miyao, Chino (JP); Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 9 days.

(21) Appl. No.: 18/450,356

(22) Filed: Aug. 15, 2023

(65) Prior Publication Data

US 2024/0061256 A1 Feb. 22, 2024

(30) Foreign Application Priority Data

Aug. 17, 2022 (JP) ................. 2022-129931

(51) Int. Cl.
*G02B 27/01* (2006.01)
*G02B 27/00* (2006.01)
*G02B 27/09* (2006.01)
*G02B 27/14* (2006.01)

(52) U.S. Cl.
CPC ..... *G02B 27/0176* (2013.01); *G02B 27/0006* (2013.01); *G02B 27/0983* (2013.01); *G02B 27/144* (2013.01)

(58) Field of Classification Search
CPC ..... G02B 27/017; G02B 27/01; G06F 1/1654; G06F 1/1637
See application file for complete search history.

(56) References Cited

U.S. PATENT DOCUMENTS

2009/0168131 A1 7/2009 Yamaguchi et al.
2017/0237935 A1* 8/2017 Totani ............... G02B 27/0176
348/802

FOREIGN PATENT DOCUMENTS

JP 2009157291 7/2009

* cited by examiner

*Primary Examiner* — Robin J Mishler
(74) *Attorney, Agent, or Firm* — JCIPRNET

(57) ABSTRACT

An HMD includes a first display element, a holder configured to hold the first display element, a first projection optical system configured to project an image formed on the first display element, a barrel which is a case configured to house the first projection optical system in a positioned state, and a dust-proof structure configured to achieve fixing of the holder and the barrel while ensuring dust-proofing of the holder and the barrel, wherein the holder includes a support frame inserted into the barrel through an insertion opening formed at the barrel while supporting the first display element, and a base plate coupled to a root of the support frame, the barrel includes a pedestal facing the base plate, and the dust-proof structure includes an adhesive material extending along a periphery of the base plate and protruding to the pedestal.

12 Claims, 17 Drawing Sheets

HEAD-MOUNTED DISPLAY APPARATUS, OPTICAL UNIT, AND MANUFACTURING METHOD OF OPTICAL UNIT

The present application is based on, and claims priority from JP Application Serial Number 2022-129931, filed Aug. 17, 2022, the disclosure of which is hereby incorporated by reference herein in its entirety.

BACKGROUND

1. Technical Field

The present disclosure relates to a head-mounted display apparatus and an optical unit that enable observation of a virtual image, and a manufacturing method of the optical unit.

2. Related Art

A head-mounted display apparatus has been known in which a unit that houses optical members such as a display element and a lens is covered with a housing, and packing is provided between a light-guiding member exposed outside and the housing, in order to ensure dust resistance and water resistance (JP 2009-157291 A).

In the apparatus of the related art described above, since the housing and an elastic sealing member such as the packing are required in order to house the optical members in the unit and further to obtain the dust resistance, the apparatus becomes large in order to obtain the dust resistance.

SUMMARY

A head-mounted display apparatus in one aspect of the present disclosure includes a display element, a holder configured to hold the display element, a projection optical system configured to project an image formed on the display element, a case configured to house the projection optical system in a positioned state, and a dust-proof structure configured to achieve fixing of the holder and the case while ensuring dust-proofing of the holder and the case, wherein the holder includes a support frame inserted into the case through an insertion opening formed at the case while supporting the display element, and a base plate coupled to a root of the support frame, the case includes a holder pedestal facing the base plate, and the dust-proof structure includes an adhesive material extending along a periphery of the base plate and protruding to the holder pedestal.

A manufacturing method of an optical unit in one aspect of the present disclosure is a manufacturing method of an optical unit in which a holder for holding a display element is fixed to a case for housing a projection optical system in a positioned state, the holder including a support frame inserted into the case through an insertion opening formed at the case while supporting the display element, and a base plate coupled to a root of the support frame, the manufacturing method including inserting the support frame into the insertion opening formed at the case, and fixing the base plate by an adhesive material to a holder pedestal provided near the insertion opening of the case.

DESCRIPTION OF EXEMPLARY EMBODIMENTS

First Exemplary Embodiment

A first exemplary embodiment of a head-mounted display apparatus according to the present disclosure will be described below with reference to FIGS. 1, 2 and the like.

Figure 1:
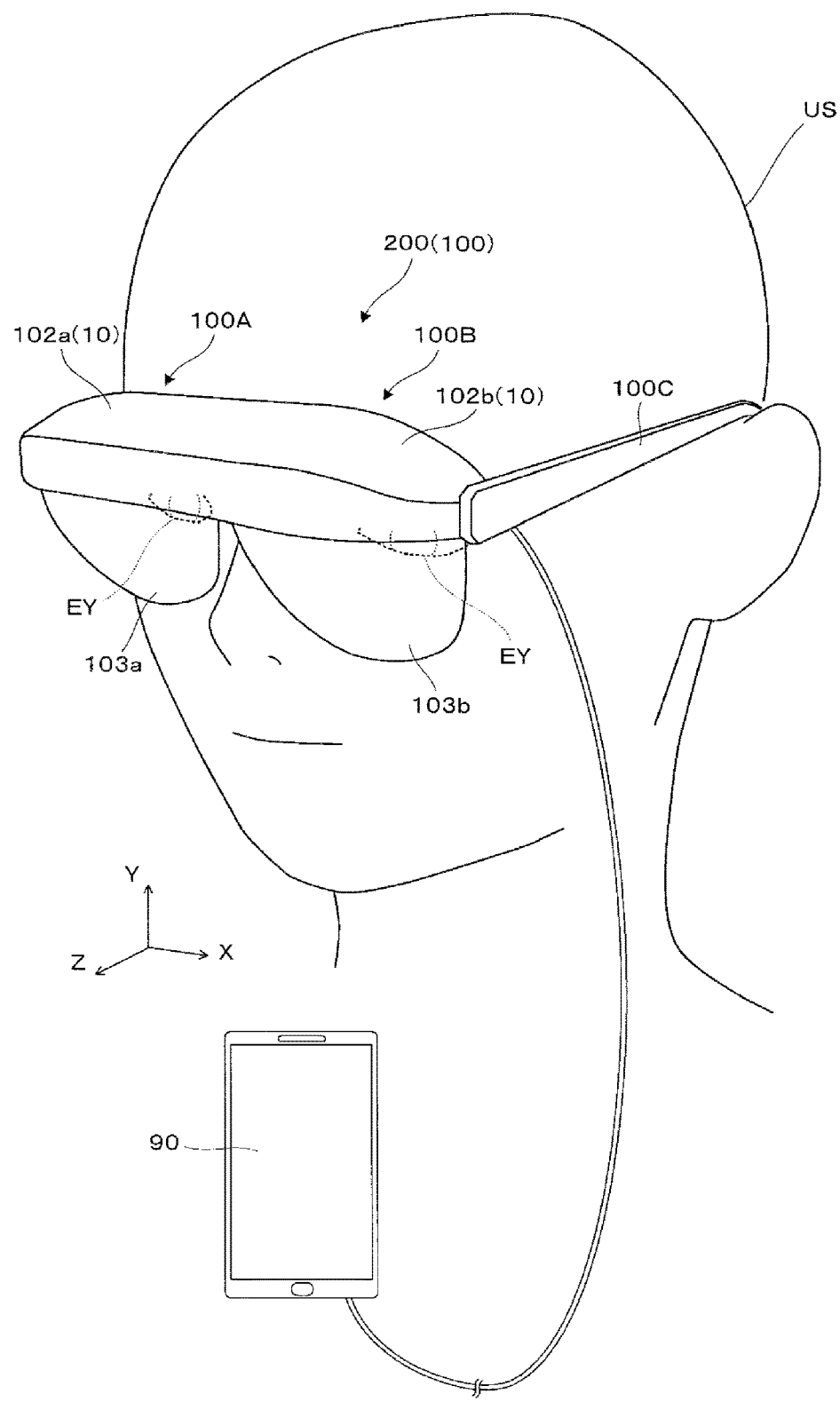
FIG. 1 is an external perspective view for explaining a mounted state of a head-mounted display apparatus of a first exemplary embodiment.

FIG. 1 is a diagram for explaining a mounted state of a head-mounted display apparatus (hereinafter, also referred to as a head-mounted display or an "HMD") 200, and the HMD 200 allows an observer or wearer US who is wearing the HMD 200 to recognize an image as a virtual image. In FIG. 1 and the like, X, Y, and Z indicate an orthogonal coordinate system, a +X direction corresponds to a lateral direction in which both eyes EY of the observer or wearer US wearing the HMD 200 or an image display device 100 are aligned, a +Y direction corresponds to an upward direction orthogonal to the lateral direction in which the both eyes EY are aligned for the wearer US, and a +Z direction corresponds to a forward or front direction for the wearer US. The ±Y directions are parallel to the vertical axis or the vertical direction.

The HMD 200 includes a right-eye first display device 100A, a left-eye second display device 100B, a pair of temple type support devices 100C that support the display devices 100A and 100B, and a user terminal 90 as an information terminal. The first display device 100A alone functions as an HMD, and includes a first display driving unit 102a arranged at an upper portion thereof, and a first combiner 103a that has a spectacle lens shape and covers a front of an eye. The second display device 100B alone functions as an HMD similarly, and includes a second display driving unit 102b arranged at an upper portion thereof, and a second combiner 103b that has a spectacle lens shape and covers a front of an eye. The support devices 100C are mounting members mounted on a head of the wearer US, and support upper end sides of the pair of combiners 103a and 103b via the display driving units 102a and 102b that are integrated in appearance. The first display device 100A and the second display device 100B are optically identical or left-right inverted, and detailed description of the second display device 100B will be omitted.

Figure 2:
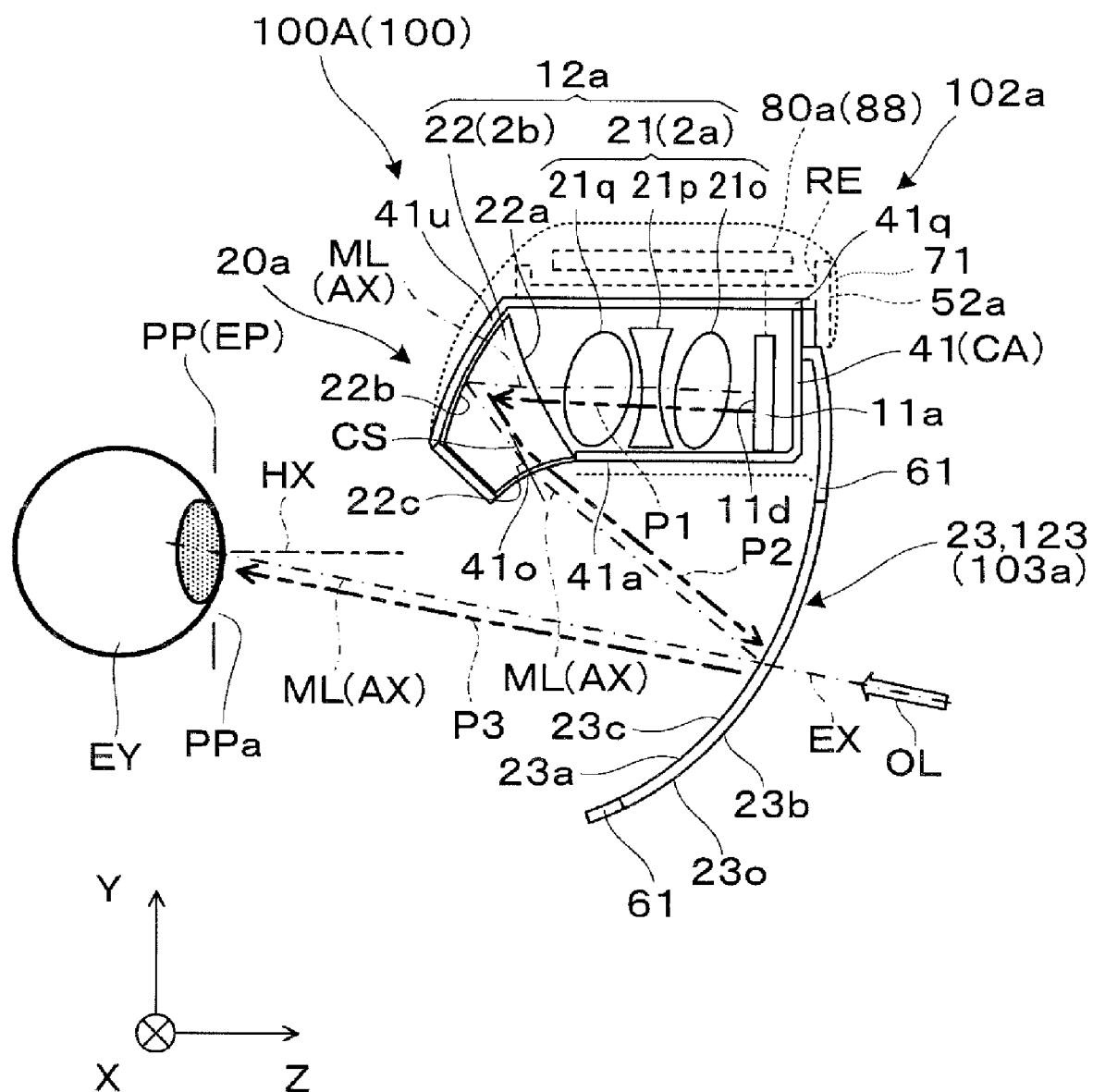
FIG. 2 is a side cross-sectional view for explaining internal structure of a display device on one side.

FIG. 2 is a side cross-sectional view for explaining internal structure of the first display device 100A. The first display device 100A includes a first display element 11a, a first display unit 20a and a first circuit member 80a. The first display element 11a is an image light generating device and is also referred to as a video element. The first display unit 20a is an imaging optical system that forms a virtual image and includes a projection lens 21, a prism mirror 22 and a see-through mirror 23 in an integrated state. In the first display unit 20a, the projection lens 21 and the prism mirror 22 function as a first projection optical system 12a on which image light ML from the first display element 11a is incident, and the see-through mirror 23 functions as a partially transmissive mirror 123 that partially reflects the image light ML emitted from the above first projection optical system 12a toward a pupil position PP or the eye EY. The first projection optical system 12a projects an image formed on the first display element 11a. The first display unit 20a has the first projection optical system 12a and the first combiner 103a in an integrated state. The projection lens 21 constituting the first projection optical system 12a corresponds to a first optical member 2a arranged on a light emission side of the first display element 11a, and the prism mirror 22 corresponds to a second optical member 2b arranged on the light emission side of the first optical member 2a which is the projection lens 21. Further, the first display element 11a, the projection lens 21, and the prism mirror 22 correspond to a part of the first display driving unit 102a illustrated in FIG. 1, and the see-through mirror 23 is arranged on the light emission side of the second optical member 2b and corresponds to the first combiner 103a illustrated in FIG. 1. The projection lens 21 and the prism mirror 22 constituting the first projection optical system 12a are fixed together with the first display element 11a in a container-shaped barrel 41 in a mutually positioned state. The barrel 41 is a case CA that houses optical elements constituting the first projection optical system 12a in a positioned state.

The barrel 41 that supports the optical members 2a and 2b constituting the first projection optical system 12a is supported by a first frame 52a and is arranged below the first frame 52a. The first frame 52a is covered by a cover 71, and the barrel 41 is also entirely covered by the cover 71. The first frame 52a is formed of a metallic material. The barrel 41 and the cover 71 are formed of a light-shielding resin material, and one surface of the prism mirror 22 is exposed at an emission opening 410 of the barrel 41. A barrel cover 41u at an upper portion of the barrel 41 abuts on the first frame 52a so as to be fitted thereto, and the barrel 41 is fixed in a state of being suspended from the first frame 52a. As a result, the first display unit 20a is fixed in a state of being suspended from the first frame 52a via the barrel 41. The first frame 52a has a recess RE on an upper side for arranging the first circuit member 80a.

In the first display device 100A, the first display element 11a is a self-luminous image light generation device. The first display element 11a emits the image light ML to the first projection optical system 12a. The barrel 41 houses and supports the first display element 11a together with the optical elements constituting the first projection optical system 12a. The first display element 11a is, for example, an organic electroluminescence (EL) display, and forms a color still image or moving image on a two-dimensional display surface 11d. The first display element 11a performs display operation by being driven by the first circuit member 80a or a display control device 88 including the first circuit member 80a. The first display element 11a is not limited to the organic EL display, and can be replaced with a display device using inorganic EL, an organic LED, an LED array, a laser array, a quantum dot light emission element, or the like. The first display element 11a is not limited to the self-luminous image light generation device, and may include an LCD and another light modulation element, and may form an image by illuminating the light modulation element with a light source such as a backlight. As the first display element 11a, a liquid crystal on silicon (LCOS) (LCoS is a registered trademark), a digital micro-mirror device, or the like may be used instead of the LCD. Note that even the first display device 100A excluding the display control device 88 or the first circuit member 80a is also referred to as the image display device 100.

Figure 3:
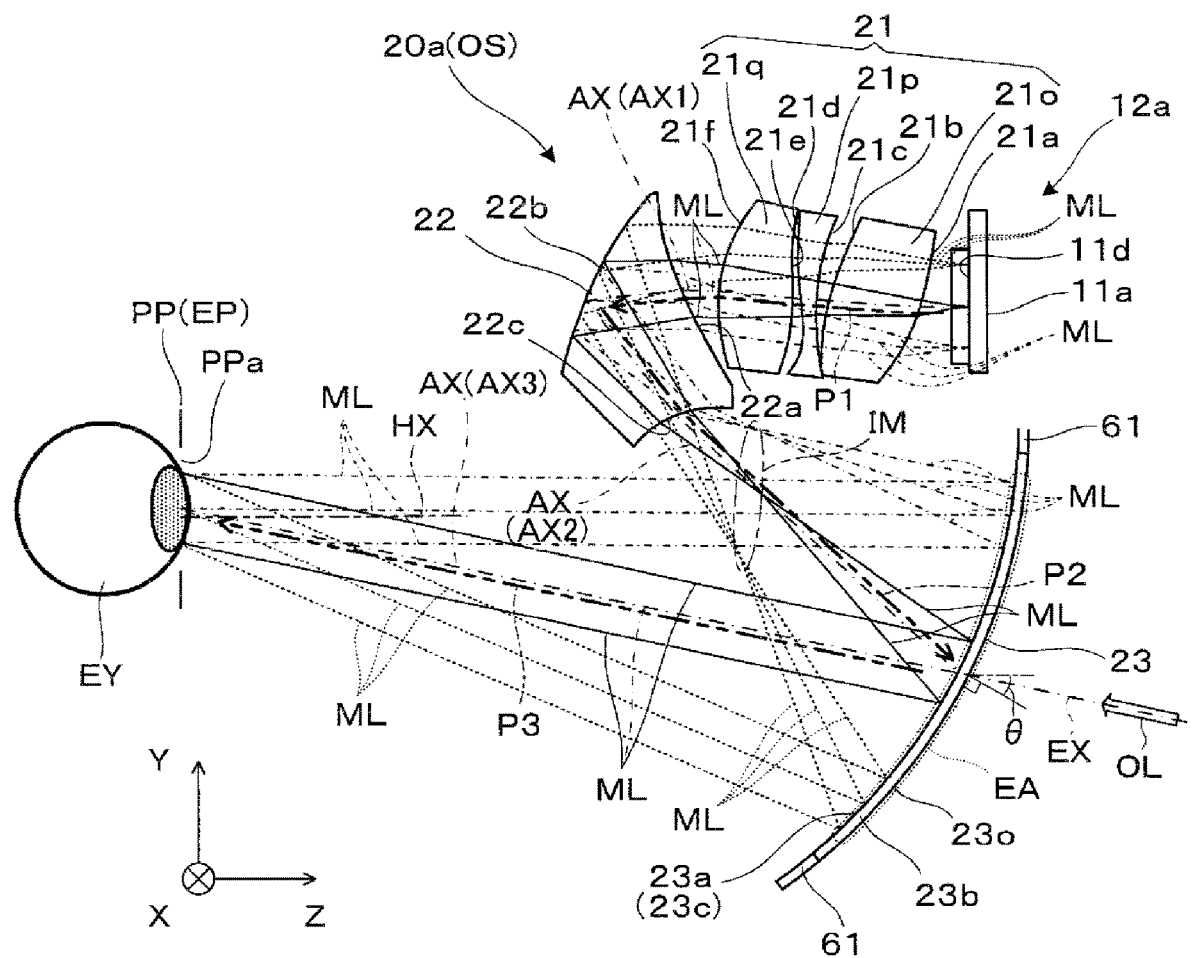
FIG. 3 is a side cross-sectional view for specifically explaining optical structure of a display unit.

FIG. 3 is a side cross-sectional view for specifically explaining optical structure of the first display unit 20a. The first display unit 20a includes two reflection surfaces, and an optical path is bent by the see-through mirror 23 and the prism mirror 22. The first display unit 20a is an off-axis optical system OS. The projection lens 21, the prism mirror 22 and the see-through mirror 23 are arranged to be non-axially symmetric. In this first display unit 20a, by bending an optical axis AX in an off-axis surface parallel to a YZ plane which is a reference surface, the optical elements 21, 22 and 23 are arrayed along the off-axis surface (that is the reference surface). Specifically, in the off-axis surface parallel to the YZ plane and corresponding to a plane of paper, an optical path portion P1 from the projection lens 21 to a reflection surface 22b, an optical path portion P2 from the reflection surface 22b to the see-through mirror 23, and an optical path portion P3 from the see-through mirror 23 to the pupil position PP are arranged so as to be bent in a Z shape in two stages. Correspondingly, an optical axis portion AX1 from the projection lens 21 to the reflection surface 22b, an optical axis portion AX2 from the reflection surface 22b to the see-through mirror 23, and an optical axis portion AX3 from the see-through mirror 23 to the pupil position PP are arranged so as to be bent in a Z shape in two stages. In the see-through mirror 23, a normal line at a central position intersecting with the optical axis AX forms an angle θ of about 40 to 50° with respect to a Z direction. In the first display unit 20a, the optical elements 21, 22 and 23 constituting the first display device 100A are arrayed so that height positions thereof are changed in a longitudinal direction, and an increase in a lateral width of the first display device 100A can be prevented. Further, since the optical path portions P1 to P3 or the optical axis portions AX1 to AX3 are arranged to be bent in a Z shape in the two stages by folding of the optical path due to reflection by the prism mirror 22 and the like, and the optical path portions P1 and P3 or the optical axis portions AX1 and AX3 are relatively close to horizontal, it is possible to reduce a size of the first display unit 20a both in an up-down direction and a front-back direction. In addition, the inclination angle θ at the central position of the see-through mirror 23 is from 40 to 50°, thus when an inclination of the optical path portion P3 corresponding to a line of sight is constant, an inclination of the optical path portion P2 with respect to a Z-axis is from 70° to 90°, and it is easy to reduce a thickness in the Z direction of the image display device 100.

In the first display unit 20a, the optical path portion P1 from the projection lens 21 to the reflection surface 22b extends in a slightly obliquely upward direction or a direction nearly parallel to the Z direction toward a back side with respect to a viewpoint. The optical path portion P2 from the reflection surface 22b to the see-through mirror 23 extends obliquely downward toward a front side. With a horizontal plane direction (XZ plane) as a reference, an inclination of the optical path portion P2 is larger than an inclination of the optical path portion P1. The optical path portion P3 from the see-through mirror 23 to the pupil position PP extends slightly obliquely upward or in a direction nearly parallel to the Z direction toward the back side. In the illustrated example, a portion of the optical axis AX corresponding to the optical path portion P3 corresponds to approximately −10°, with a downward direction toward the +Z direction as negative. That is, the partially transmissive mirror 123 reflects the image light ML such that the optical axis AX or the optical path portion P3 is directed upward by a predetermined angle, that is, upward by about 10°. As a result, an emission optical axis EX which is an extension of the optical axis portion AX3 corresponding to the optical path portion P3 is inclined downward by approximately 10° with respect to a central axis HX parallel to the forward +Z direction and extends. This is because a line of sight of a human being is stable in a slightly lowered eye state in which the line of sight is inclined downward by approximately 10° with respect to a horizontal direction. The central axis HX that extends in the horizontal direction with respect to the pupil position PP assumes a case in which the wearer US wearing the first display device 100A relaxes in an upright posture and faces the front and gazes at the horizontal direction or the horizontal line.

In the first display unit 20a, the projection lens 21 includes a first lens 21o, a second lens 21p and a third lens 21q. The projection lens 21 receives the image light ML emitted from the first display element 11a and causes the image light ML to be incident on the prism mirror 22. The projection lens 21 focuses the image light ML emitted from the first display element 11a into a state close to a parallel luminous flux. An incident surface 21a and an emission surface 21b of the first lens 21o, an incident surface 21c and an emission surface 21d of the second lens 21p, and an incident surface 21e and an emission surface 21f of the third lens 21q that constitute the projection lens 21 are free form surfaces or aspherical surfaces. Each of the optical surfaces 21a, 21b, 21c, 21d, 21e and 21f is asymmetric with respect to a longitudinal direction parallel to the YZ plane and intersecting the optical axis AX with the optical axis AX interposed therebetween, and is symmetric with respect to a lateral direction or an X direction with the optical axis AX interposed therebetween. The first lens 21o, the second lens 21p and the third lens 21q are formed of, for example, resin, but may also be formed of glass. An antireflection film can be formed at each of the optical surfaces of the first lens 21o, the second lens 21p and the third lens 21q constituting the projection lens 21.

The prism mirror 22 is an optical member having a refractive reflection function of combining a mirror and a lens, and refracts and reflects the image light ML from the projection lens 21. The prism mirror 22 has an incident surface 22a arranged on the light emission side of the first optical member, the reflection surface 22b for bending the optical axis AX, and an emission surface 22c facing the reflection surface 22b and arranged in a direction symmetrical to the incident surface 22a. The prism mirror 22 emits the image light ML incident from the front side at which the projection lens 21 is arranged such that the image light ML is bent in a direction inclined downward with respect to a direction in which an incident direction is reversed (a direction of a light source seen from the prism mirror 22). The incident surface 22a, the reflection surface 22b and the emission surface 22c which are the optical surfaces constituting the prism mirror 22 are asymmetric with respect to the longitudinal direction parallel to the YZ plane and intersecting the optical axis AX with the optical axis AX interposed therebetween, and are symmetric with respect to the lateral direction or the X direction with the optical axis AX interposed therebetween. The optical surfaces of the prism mirror 22, that is, the incident surface 22a, the reflection surface 22b and the emission surface 22c are, for example, free form surfaces. The incident surface 22a, the reflection surface 22b and the emission surface 22c are not limited to the free form surfaces, and may be aspherical surfaces. The prism mirror 22 may be formed of, for example, resin, but may also be formed of glass. The reflection surface 22b is not limited to one that reflects the image light ML by total reflection, and may be a reflection surface formed of a metal film or a dielectric multilayer film. In this case, a reflection film formed of a single layer film or multilayer film formed of metal such as Al or Ag is formed above the reflection surface 22b by vapor deposition or the like, or a sheet-shaped reflection film formed of metal is affixed thereto. Although detailed illustration is omitted, an antireflection film can be formed above the incident surface 22a and the emission surface 22c.

The emission surface 22c of the prism mirror 22 is a concave surface as a whole, is a concave surface on the off-axis plane that is parallel to the YZ plane and through which the optical axis portions AX1 to AX3 pass, that is, on the plane of paper, and is also a concave surface in a cross section surface CS (see FIG. 2) perpendicular to the YZ plane and passing through a center of the emission surface 22c. The emission surface 22c of the prism mirror 22 is exposed at the emission opening 410 of the barrel 41, thus by being formed as the concave surface, contact with an external object can be easily avoided and occurrence of damage can be suppressed. The emission surface 22c of the prism mirror 22 is arranged near a relatively small intermediate image IM and is arranged at a position where a light flux cross-section of the image light ML is narrowed, thus an area thereof can be made relatively small. By making the area of the emission surface 22c of the prism mirror 22 relatively small, it is also possible to suppress damage occurring in the emission surface 22c.

The see-through mirror 23 or the first combiner 103a is a curved plate-shaped reflective optical member that functions as a concave surface mirror, and reflects the image light ML from the prism mirror 22 and partially transmits outside light OL. The see-through mirror 23 reflects the image light ML from the prism mirror 22 toward the pupil position PP. The see-through mirror 23 has a reflection surface 23a and an outer surface 23o.

The see-through mirror 23 partially reflects the image light ML. The see-through mirror 23 is a concave mirror that covers the pupil position PP at which the eye EY or the pupil is arranged, has a concave shape toward the pupil position PP, and has a convex shape toward the outside. The pupil position PP or an opening PPa thereof is referred to as an eye point or an eye box. The pupil position PP or the opening PPa corresponds to an emission pupil EP on an emission side of the first display unit 20a. The see-through mirror 23 is a collimator, and converges a main beam of the image light ML emitted from each point on the display surface 11d, forming an image in a vicinity of the emission side of the prism mirror 22 of the first projection optical system 12a, and then spreading, at the pupil position PP. The see-through mirror 23, as the concave mirror, enables enlarged viewing of the intermediate image IM formed by the first display element 11a as the image light generation device and re-imaged by the first projection optical system 12a. More specifically, the see-through mirror 23 functions in the same manner as a field lens, and causes the image light ML from each point of the intermediate image IM formed behind the emission surface 22c of the prism mirror 22 to be incident on the pupil position PP in a collimated state so as to be collected as a whole. The see-through mirror 23 needs to have a spread equal to or greater than that of an effective area EA corresponding to an angle of view from the viewpoint of being arranged between the intermediate image IM and the pupil position PP. Here, the angle of view is a combination of visual field angles in upper, lower, left and right directions with reference to the optical axis AX extending in a front direction of the eyes, and is set to about 40 to 50° in a specific example. In the see-through mirror 23, an outer area extending to the outside of the effective area EA does not directly affect image formation, and thus can have any surface shape, however, from the viewpoint of ensuring an appearance like a spectacle lens, it is desirable that the surface shape has the same curvature as that of a surface shape an outer edge of the effective area EA, or continuously change from the outer edge.

The see-through mirror 23 is a semi-transmissive type mirror plate having structure in which a transmissive reflective film 23a is formed above a back surface of a plate-shaped body 23b. The reflection surface 23a of the see-through mirror 23 is asymmetric with respect to the longitudinal direction parallel to the YZ plane and intersecting the optical axis AX, with the optical axis AX interposed therebetween, and is symmetric with respect to the lateral direction or the X direction with the optical axis AX interposed therebetween. The reflection surface 23c of the see-through mirror 23 is, for example, a free form surface. The reflection surface 23c is not limited to the free form surface, and may be an aspherical surface. The reflection surface 23c needs to have a spread equal to or greater than that of the effective area EA. When the reflection surface 23c is formed in the outer area wider than the effective area EA, a difference in visibility is less likely to occur with respect to an external image from behind the effective area EA and an external image from behind the outer area.

The reflection surface 23c of the see-through mirror 23 transmits a part of light when the image light ML is reflected. Thus, because the outside light OL passes through the see-through mirror 23, see-through view of the outside is enabled, and a virtual image can be superimposed on an outside image. At this time, when the plate-shaped body 23b has a thickness of less than or equal to approximately a few millimeters, a change in magnification of the outside image can be curbed to be small. A reflectance of the reflection surface 23c with respect to the image light ML and the outside light OL is set to from 10% to 50% in a range of an incident angle of the assumed image light ML (corresponding to the effective area EA) from the viewpoint of ensuring a brightness of the image light ML and facilitating observation of the outside image by see-through. The plate-shaped body 23b which is a base material of the see-through mirror 23 is formed of, for example, resin, and may also be formed of glass. The plate-shaped body 23b is formed of the same material as the support plate 61 that supports the plate-shaped body 23b from the surrounding thereof, and has the same thickness as the support plate 61. The transmissive reflective film 23a is formed of, for example, a dielectric multilayer film configured of a plurality of dielectric layers having an adjusted film thickness. The transmissive reflective film 23a may be a single-layer film or a multilayer film of metal such as Al or Ag of which a film thickness has been adjusted. The transmissive reflective film 23a may be formed by laminating using deposition, for example, and may also be formed by affixing a sheet-shaped reflection film. An antireflection film is formed at the outer surface 23o of the plate-shaped body 23b.

In describing the optical path, the image light ML from the first display element 11a is incident on the projection lens 21 and is emitted from the projection lens 21 in a substantially collimated state. The image light ML that has passed through the projection lens 21 is incident on the prism mirror 22, passes through the incident surface 22a while being refracted, is reflected by the reflection surface 22b with a high reflectance close to 100%, and is refracted again by the emission surface 22c. The image light ML from the prism mirror 22, after once forming the intermediate image IM, is incident on the see-through mirror 23 and is reflected by the reflection surface 23c with a reflectance of about 50% or less. The image light ML reflected by the see-through mirror 23 is incident on the pupil position PP at which the eye EY or pupil of the wearer US is placed. The outside light OL that has passed through the see-through mirror 23 and the support plate 61 therearound is also incident on the pupil position PP. In other words, the wearer US wearing the first display device 100A can observe a virtual image of the image light ML in a state in which it overlaps the outside image.

Figure 4:
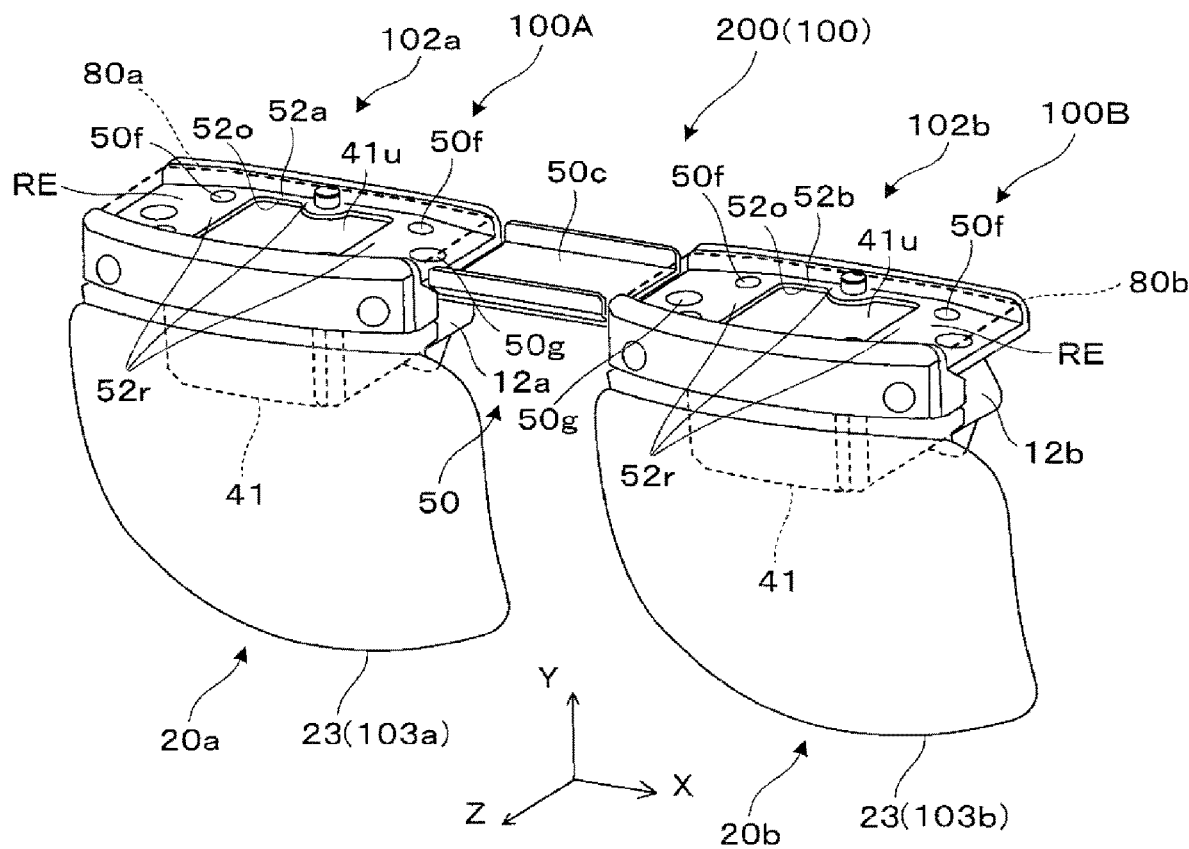
FIG. 4 is a perspective view for explaining support structure of the display unit.

With reference to FIG. 4, support structure incorporated in the display driving units 102a and 102b of the HMD 200 will be described. In the first display unit 100A, the first frame 52a is fixed to the barrel 41 of the first display unit 20a by using a fastener 50f such as a screw or the like, and supports the first display unit 20a in a suspending manner. At the first frame 52a, a rectangular opening 52o is formed, and a part of a periphery 52r of the rectangular opening 52o abuts on and adheres tightly to the barrel cover 41u of the first display unit 20a. Note that the first circuit member 80a is arranged at the recess RE above the first frame 52a. The first frame 52a is formed of, for example, a magnesium alloy. In the second display unit 100B, a second frame 52b is fixed to the barrel 41 of the second display unit 20b by using the fastener 50f such as a screw or the like, and supports the second display unit 20b in a suspending manner. At the second frame 52b, the rectangular opening 52o is formed, and a part of the periphery 52r of the rectangular opening 52o abuts on and adheres tightly to the barrel cover 41u of the second display unit 20b. Note that a second circuit member 80b is arranged at the recess RE above the second frame 52b. The second frame 52b is formed of, for example, a magnesium alloy.

A support device 50 includes, in addition to the first frame 52a and the second frame 52b, a joint 50c that links and relatively fixes the first frame 52a and the second frame 52b. The joint 50c is a member made of metal such as a magnesium alloy, is linked to one end portion of the first frame 52a using a fastener 50g or the like, and is linked to another end portion of the second frame 52b using the fastener 50g or the like. The first frame 52a to which the first display unit 20a is attached and the second frame 52b to which the second display unit 20b is attached are fixed in a mutually and optically positioned state via the joint 50c at a center.

Figure 5:
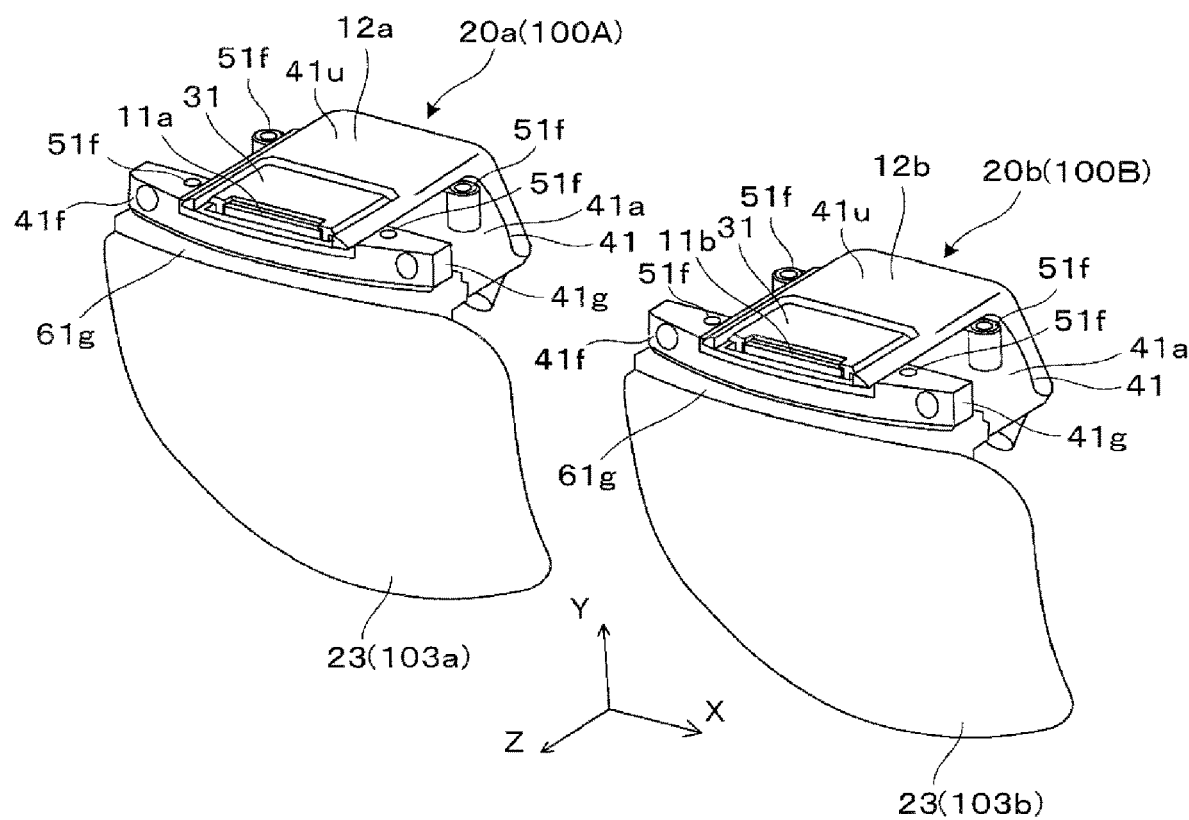
FIG. 5 is a perspective view for explaining an outer shape of the display unit.

FIG. 5 is a perspective view for explaining a state in which the support device 50 is removed from the HMD 200 illustrated in FIG. 4. The first display unit 20a has the first projection optical system 12a and the first combiner 103a in an integrated state, and the second display unit 20b has a second projection optical system 12b and the second combiner 103b in an integrated state. In the first projection optical system 12a, the first combiner 103a is fixed to the barrel 41 by adhesion or the like in a positioned state. The barrel 41 of the first projection optical system 12a has a space for housing the first display element 11a, and supports the first display element 11a in a state of being positioned with respect to the projection lens 21 and the like illustrated in FIG. 2, via a holder 31 for holding the first display device 11a. In the second projection optical system 12b, the second combiner 103b is fixed to the barrel 41 by adhesion or the like in a positioned state. The barrel 41 of the second projection optical system 12b has a space for housing a second display element 11b, and supports the second display element 11b in a state of being positioned with respect to the projection lens 21 and the like illustrated in FIG. 2, via the holder 31 for holding the second display device 11b. Each barrel 41 is provided with a plurality of fastening portions 51f for screwing to the first frame 52a or the second frame 52b illustrated in FIG. 4.

Figure 6:
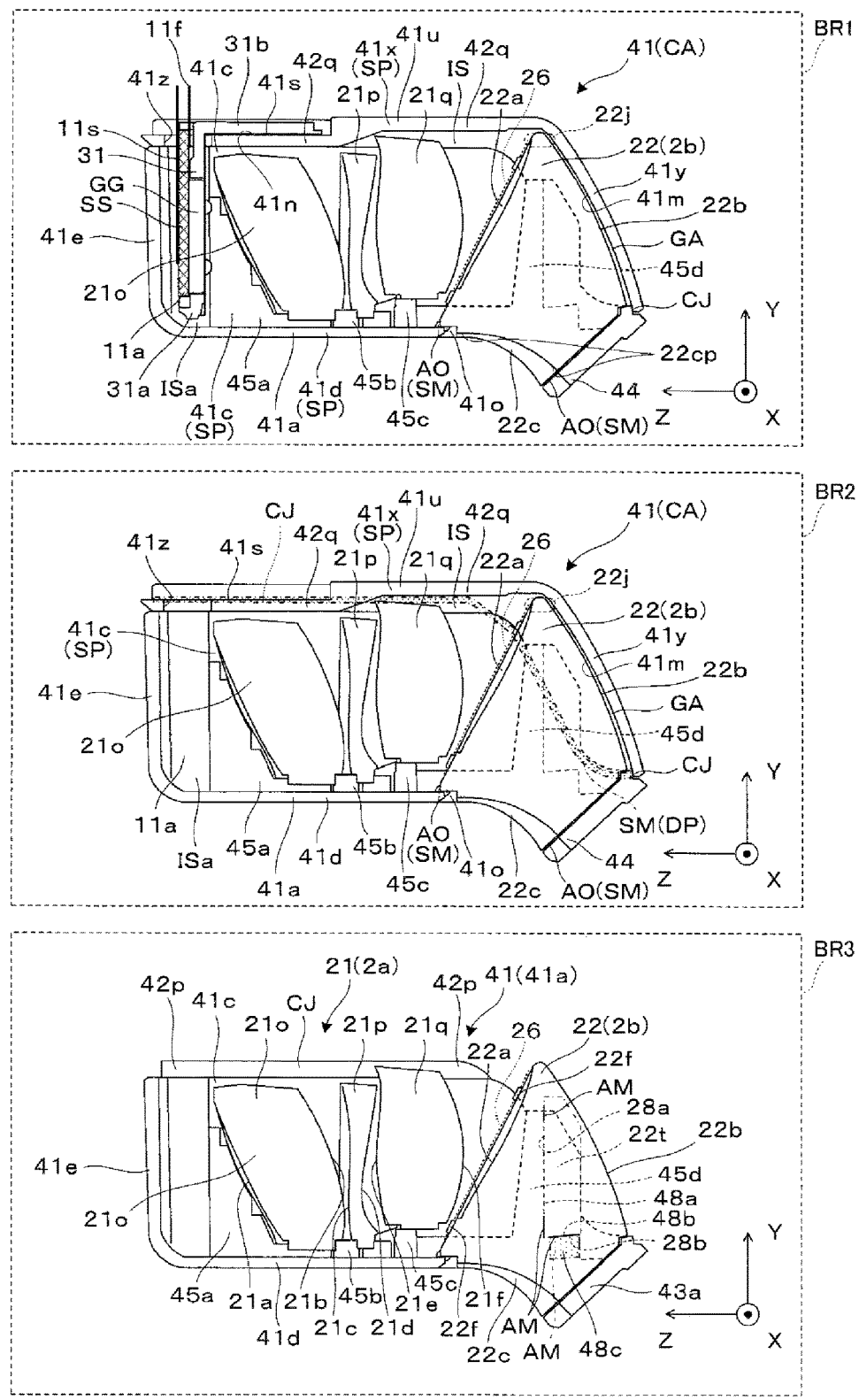
FIG. 6 illustrates side cross-sectional views of a barrel and an optical member and the like held by the barrel.

Structure of the barrel 41 will be described with reference to FIGS. 6 and 7. In FIG. 6, a region AR1 illustrates a side cross-sectional view of the barrel 41 and the first display element 11a and the optical members 2a and 2b held by the barrel 41, a region AR2 illustrates a side cross-sectional view of a state in which the first display element 11a and the holder 31 are excluded, and a region AR3 illustrates a side cross-sectional view of a state in which the barrel cover 41u is further excluded. In addition, in FIG. 7, a region BR1 illustrates a rear view of a state in which the barrel cover 41u is removed, and a region BR2 includes a plan view of a rear end portion in a state in which the barrel cover 41u is removed.

The barrel 41 includes a barrel body 41a and the barrel cover 41u, houses the first optical member 2a and holds the second optical member 2b. The barrel body 41a and the barrel cover 41u are formed of a polycarbonate resin in consideration of support accuracy and strength of the optical elements fixed inside thereof. The barrel body 41a is a bathtub-shaped vessel with an open top, and has the emission opening 41O at a part of a bottom. The barrel cover 41u is fixed so as to cover the barrel body 41a from above. The barrel body 41a includes two side plate members 41c, a bottom plate member 41d, a front plate member 41e and two protruding portions 41f and 41g. The two side plate members 41c extend substantially parallel to an off-axis plane HS (see FIG. 7) in which the optical axis AX extends and are spaced apart from each other. The bottom plate member 41d extends substantially parallel to the XZ plane perpendicular to the off-axis plane HS in which the optical axis AX extends, and is provided with the emission opening 41O on a rear end side. The front plate member 41e links a front end of the bottom plate member 41d and front ends of the two side plate members 41c. The two protruding portions 41f and 41g extend in a lateral direction so as to protrude outward from upper portions of the two side plate members 41c.

At an inside of the side plate member 41c on one side, guide convex portions 45a, 45b, 45c and 45d each having steps, as protrusions for supporting the first lens 21o, the second lens 21p and the third lens 21q constituting the first optical member 2a, and the prism mirror 22 of the second optical member 2b are formed. Note that although not illustrated, guide convex portions similar to the guide convex portions 45a, 45b, 45c and 45d are also formed at an inner surface of the side plate member 41c on another side (see FIG. 7). The first lens 21o is positioned in a biased state by the two first guide convex portions 45a provided at the inner surfaces of the two side plate members 41c and is supported by the barrel body 41a. Similarly, the second lens 21p is positioned by the second guide convex portions 45b and supported by the barrel body 41a, the third lens 21q is positioned by the third guide convex portions 45c and supported by the barrel body 41a, and the prism mirror 22 is positioned by the fourth guide convex portions 45d and supported by the barrel body 41a.

The barrel cover 41u is arranged on an opposite side of the bottom plate member 41d and covers an inside of the barrel body 41a to form a housing space IS. The barrel cover side 41u includes a top plate 41x and a rear plate 41y. The top plate 41x extends parallel to the XZ plane, and the rear plate 41y is arranged to be inclined so as to cover an outside of the reflection surface 22b of the prism mirror 22 of the second optical member 2b. In the barrel cover 41u, a positioning holder pedestal 41s lowered by a predetermined height from a periphery is formed on the front +Z side, and an insertion opening 41z is formed in front of the holder pedestal 41s. The holder pedestal 41s provided at the barrel cover 41u faces a base plate 31b of the holder 31 at the time of and after assembly as described later. The base plate 31b is fixed to the barrel 41 while covering a part or all of the insertion opening 41z. In this case, the base plate 31b and a side surface portion SP of the barrel 41 extend substantially parallel to each other, and it is possible to prevent the base plate 31b from becoming bulky after assembly while increasing an area of the base plate 31b. The top plate 41x of the barrel cover 41u, the two side plate members 41c of the barrel body 41a and the bottom plate member 41d of the barrel body 41a constitute the side surface portion SP of the barrel 41 extending in the Z direction as a whole. An inner surface 41m of the rear plate 41y is inclined with respect to the XZ plane and the XY plane, and extends along the reflection surface 22b of the prism mirror 22 to a vicinity of the reflection surface 22b. A uniform gap GA is formed between the outside of the reflection surface 22b and the inner surface 41m of the rear plate 41y.

A plane substantially parallel to the XZ plane obtained by extending a holder pedestal surface 41n (see FIG. 11) which is a second surface formed at the holder pedestal 41s of the barrel cover 41u intersects an upper portion 22j of the second optical member 2b. This means that the holder pedestal surface 41n is formed low. By forming the holder pedestal 41s at a position recessed toward a center in the barrel 41, an amount of protrusion of the base plate 31b from the holder 31 can be suppressed.

Figure 8:
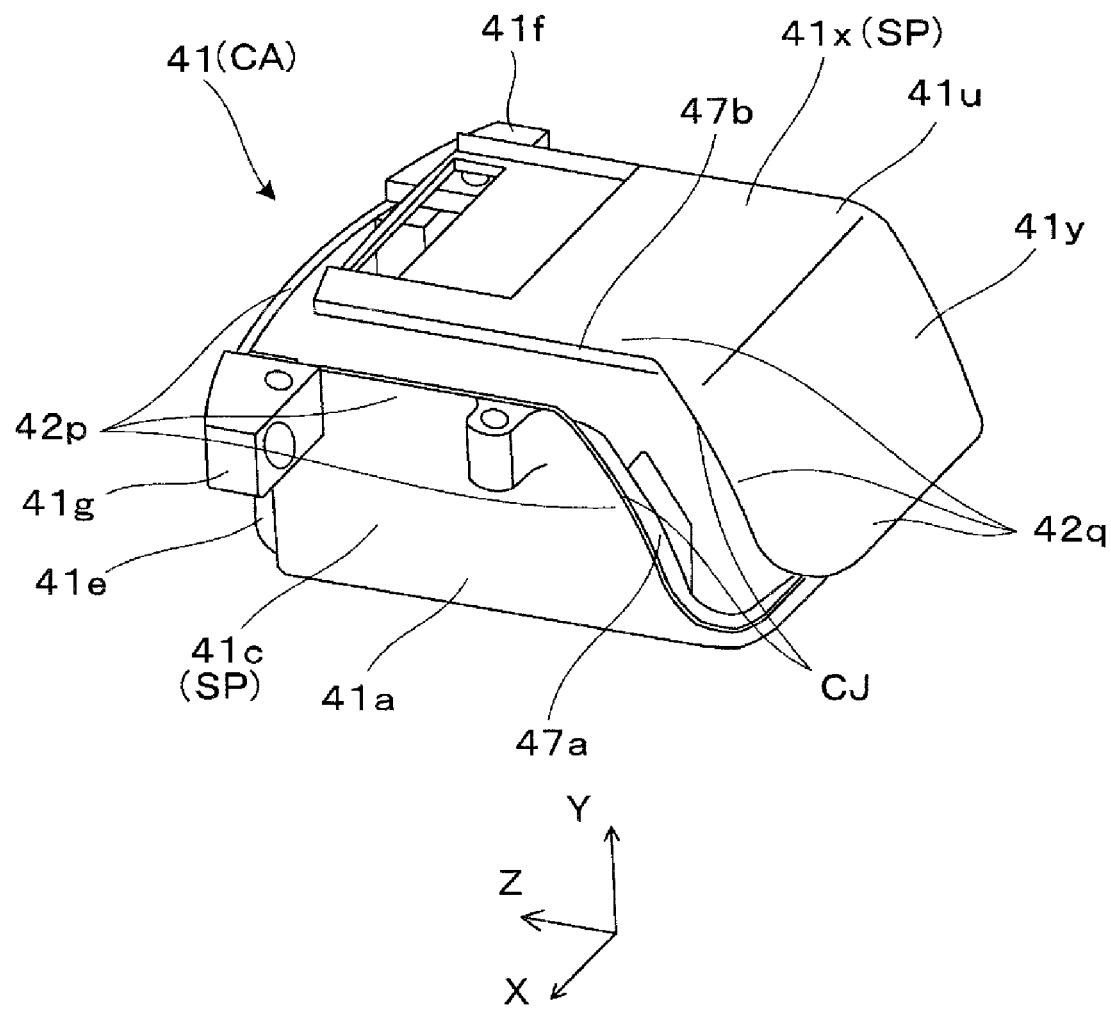
FIG. 8 is an exploded perspective view of the barrel.

As illustrated in FIG. 8, between an outer edge 42q extending along an outer periphery of the barrel cover 41u and an upper end 42p of the barrel body 41a, fitting configurations 47a and 47b such as steps are provided, for example, to achieve mutual positioning. The outer edge 42q of the barrel cover 41u and the upper end 42p of the barrel body 41a constitute a coupling portion CJ between the barrel body 41a and the barrel cover 41u. In the coupling portion CJ, a gap between the outer edge 42q of the barrel cover 41u and the upper end 42p of the barrel body 41a, that is, a gap between the fitting configurations 47a and 47b and the outer edge 42q or the upper end 42p is filled with a sealing member SM which functions as an adhesive material or a seal material (see the region AR2 in FIG. 6)). In this case, airtightness of the housing space IS can be enhanced. The sealing member SM is dust-proof structure DP.

Figure 7:
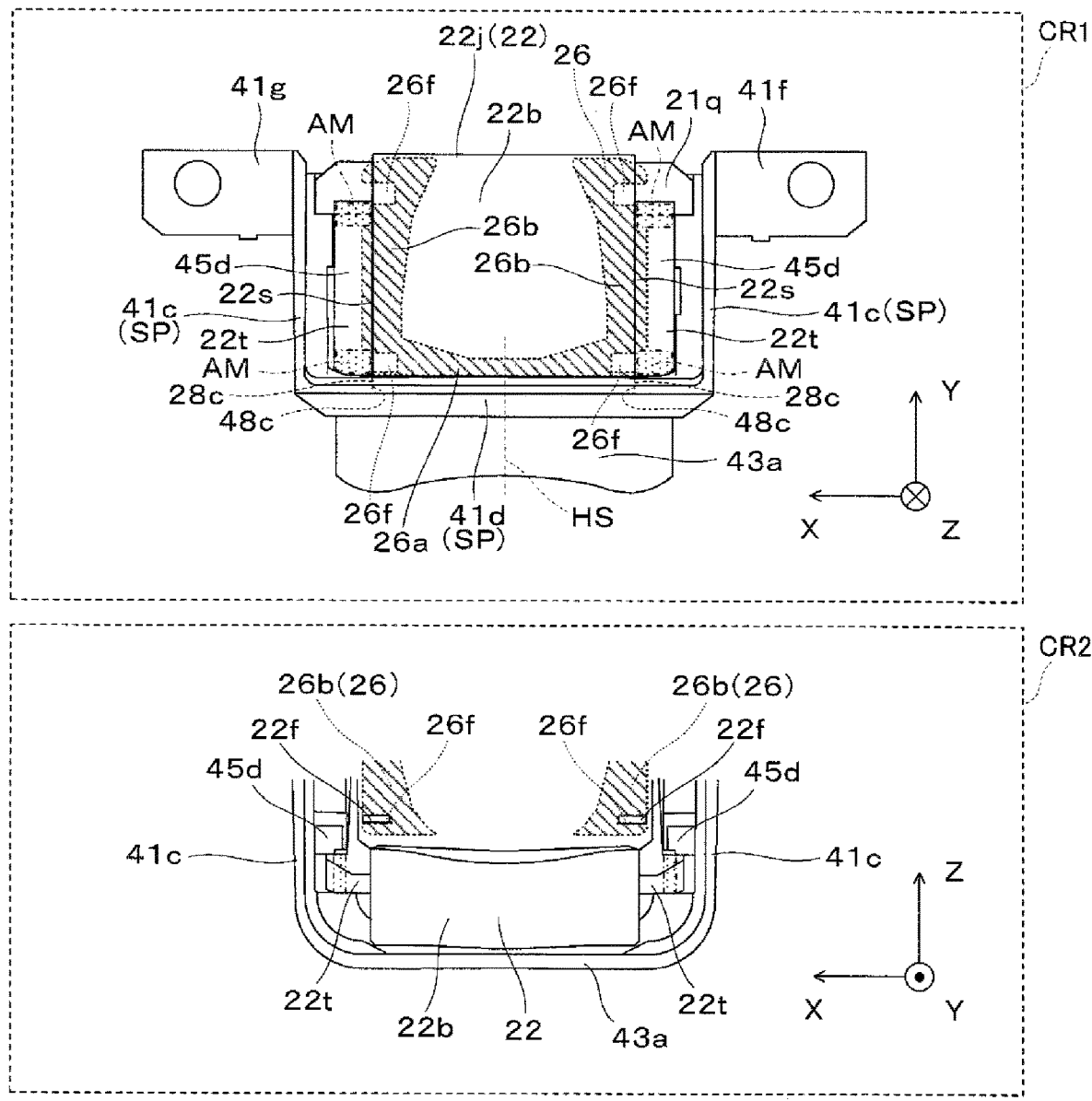
FIG. 7 illustrates a rear view and a plan view of a remaining part excluding a barrel cover.

Referring to FIGS. 6 and 7, a diaphragm plate member 26 is arranged between the first optical member 2a and the second optical member 2b in the barrel 41. It is desirable that the diaphragm plate member 26 be arranged between the first image element 11a and the intermediate image IM (see FIG. 3) and at or near a position of an intermediate pupil where a diameter of light flux from each point on the display surface 11d is largest. In the illustrated case, the diaphragm plate member 26 is attached to be adjacent to the incident surface 22a of the prism mirror 22. Referring to FIG. 7, the diaphragm plate member 26 has a central portion 26a arranged near the bottom plate member 41d of the barrel 41 and two side portions 26b extending from the central portion 26a along the two side plate members 41c. In the case of the present exemplary embodiment, an optically effective region extends to the upper portion 22j of the prism mirror 22. Therefore, the diaphragm plate member 26 is an open type including the central portion 26a corresponding to a lower side and the side portions 26b corresponding to left and right sides with an upper side omitted.

The diaphragm plate member 26 has notches 26f at four positions on a periphery, and the notches 26f are fitted to four protrusions 22f formed outside the incident surface 22a of the prism mirror 22 and on a side surface 22s side. Thus, the diaphragm plate member 26 is positioned with respect to the incident surface 22a of the prism mirror 22. The diaphragm plate member 26 is fixed to the protrusion 22f by an adhesive material around the notch 26f.

Fixing of the second optical member 2b or the prism mirror 22 in the barrel 41 will be described. The prism mirror 22 includes protrusions 22t at a pair of the incident surfaces 22a sandwiched by the incident surface 22a and the reflection surface 22b and the emission surface 22c. A pair of first support surfaces 28a on the incident surface 22a side of the protrusion 22t abut on a pair of first placement surfaces 48a provided at the guide convex portion 45d formed at the barrel body 41a. A pair of second support surfaces 28b on the emission surface 22c side of the protrusion 22t abut on a pair of second placement surfaces 48b provided at the guide convex portion 45d formed at the barrel body 41a. A pair of third support surfaces 28c facing outward and provided on a lower side of the protrusion 22t at the side surface 22s abut on an inward facing pair of third placement surfaces 48c and provided at the guide convex portion 45d formed at the barrel body 41a. By using the abutment between the first support surface 28a and the first placement surface 48a, positioning of the prism mirror 22 with respect to a position in the Z direction and an inclination about the Y-axis and the X-axis is made possible. By using the abutment between the second support surface 28b and the second placement surface 48b, positioning of the prism mirror 22 with respect to a position in the Y direction and an inclination about the Z-axis is made possible. By using the abutment between the third placement surface 48c and the third placement surface 48c, positioning of the prism mirror 22 with respect to a position in the X direction is made possible. When the prism mirror 22 is assembled to the barrel body 41a, the barrel body 41a is vertically placed so that the guide convex portion side 45d or the emission opening 41o is on an upper side. Thereafter, an adhesive material AM is applied to appropriate positions of the first placement surface 48a, the second placement surface 48b and the third placement surface 48c of the guide convex portion 45d, and the prism mirror 22 is inserted like a drawer so that the pair of protrusions 22t are placed at the pair of guide convex portions 45d. The prism mirror 22 can be precisely fixed to the barrel body 41a by hardening the adhesive material AM of each position after the positioning is completed. As the adhesive material AM, for example, a UV-curable adhesive material can be used, but the adhesive material AM is not limited thereto.

Although the method of positioning and fixing the prism mirror 22 to the guide convex portion 45d formed at the barrel body 41a has been described above, a method of fixing the first lens 21o, the second lens 21p and the third lens 21q to the first guide convex portion 45a, the second guide convex portion 45b and the third guide convex portion 45c is also similar to the case of the prism mirror 22, and description thereof will be omitted. As for an order of assembly, first, the first lens 210 is fixed to the barrel body 41a, then the second lens 21p is fixed to the barrel body 41a, then the third lens 21q is fixed to the barrel body 41a, and finally the prism mirror 22 is fixed to the barrel body 41a.

The method of fixing the prism mirror 22 and the like to the barrel body 41a is not limited to the method using the biasing described above, but may be replaced with a method using fitting or other various methods.

Figure 9:
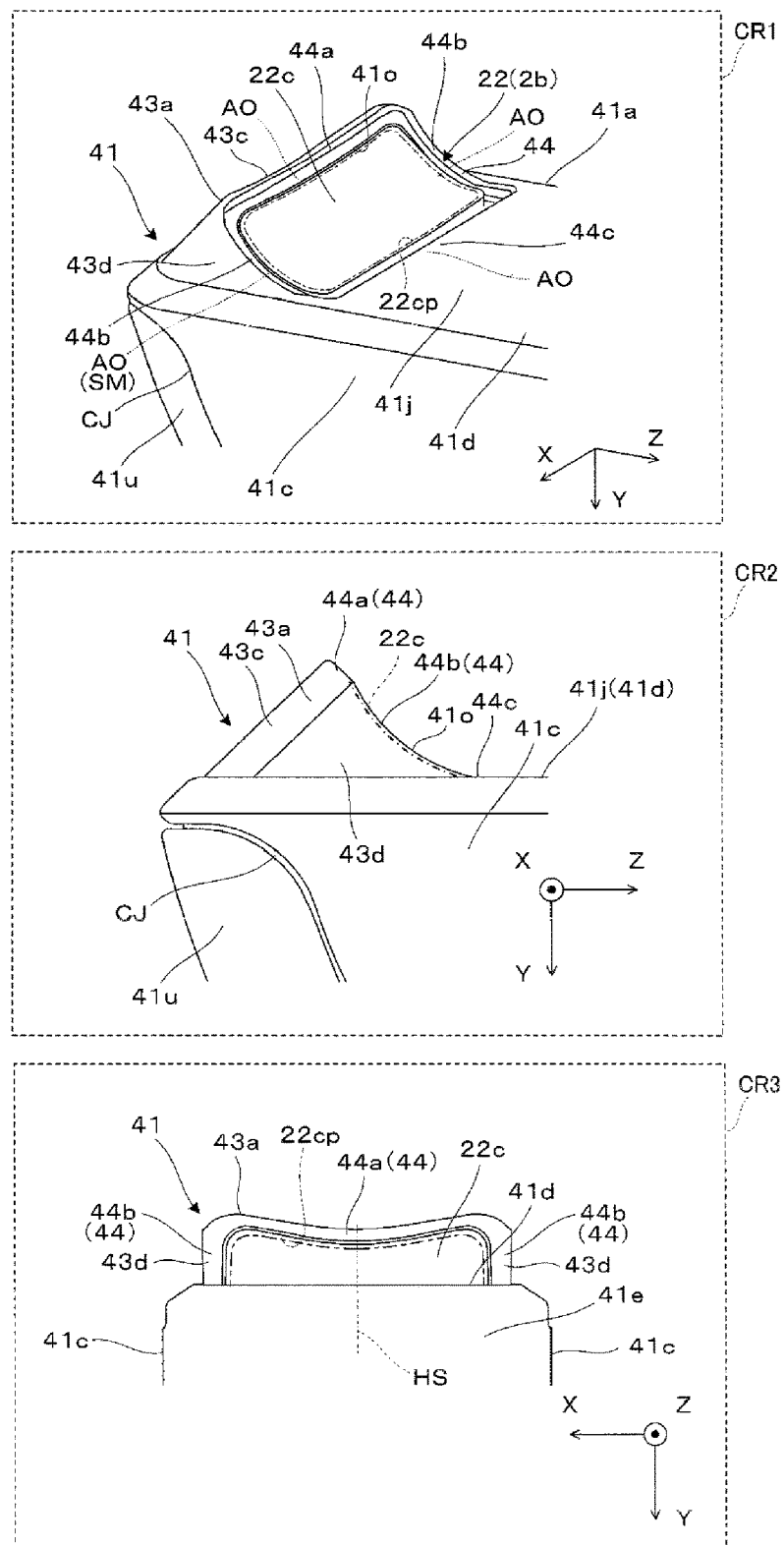
FIG. 9 illustrates a perspective view, a side view and a front view illustrating an arrangement relationship between a guard and a prism mirror.

With reference to FIG. 9, a periphery of the emission opening 41o of the barrel 41 will be described. In FIG. 9, a region CR1 illustrates a perspective view for explaining a periphery of the emission opening 41o, a region CR2 illustrates a side view for explaining the periphery of the emission opening 41o, and a region CR3 illustrates a front view for explaining the periphery of the emission opening 41o. A guard 43d is formed around the emission opening 41o provided behind the bottom plate member 41d of the barrel 41 so as to protrude from a bottom portion of the barrel 41. The guard 43a protects a side surface of the prism mirror 22 projecting downward from a main body 41j of the bottom plate member 41d. The guard 43a has an inclined rear portion 43c and a side portion 43d. The inclined emission opening 41o surrounded by the guard 43a and the main body 41j is formed. The emission opening 41o is inclined by several tens of degrees in the forward +Z direction with respect to the downward −Y direction. A rectangular annular edge portion 44 provided around the emission opening 41o is arranged so as to surround an outer edge 22cp of the emission surface 22c of the prism mirror 22. The edge portion 44 of the emission opening 41o includes a portion 44a corresponding to the rear portion 43c of the guard 43a, a portion 44b corresponding to the side portion 43d of the guard 43a, and a portion 44c corresponding to the main body 41j of the bottom plate member 41d. The edge portion 44 provided around the emission opening 41o surrounds the outer edge 22cp of the emission surface 22c of the prism mirror 22 from outside, thereby protecting the emission surface 22c of the prism mirror 22 from the surroundings. At this time, the outer edge 22cp of the emission surface 22c of the prism mirror 22 is arranged inside to be receded from the edge portion 44 of the emission opening 41o. In other words, the emission surface 22c of the prism mirror 22 is arranged to be deeper than the edge portion 44 of the emission opening 41o. To be more specific, an upper end of the outer edge 22cp of the emission surface 22c of the prism mirror 22 is lower than an upper end of the edge portion 44 of the emission opening 41o by about 0.5 mm to several mm in the +Y direction. As a result, it is possible to prevent unintended object from hitting the outer edge 22cp of the prism mirror 22 or touching the outer edge 22cp, and to suppress deterioration of the emission surface 22c.

Referring to FIGS. 6 and 9, an interval between the outer edge 22cp of the emission surface 22c of the prism mirror 22 and the edge portion 44 of the emission opening 41o, that is a gap and an inside thereof, is filled with the sealing member SM that functions as an adhesive material or a seal material. The sealing member SM seals a gap between the emission opening 41O of the barrel body 41a and a periphery of the second optical member 2b or the emission surface 22c of the prism mirror 22. In this case, the emission surface 22c of the second optical member 2b is exposed outside, but an optical surface optically upstream of the emission surface 22c of the second optical member 2b is protected by dust-proofing and water-proofing for the barrel 41. The sealing member SM filling along the emission opening 41O of the barrel body 41a is an elastic adhesive material AO. The elastic adhesive material AO is an acrylic-based silicone-based resin that is hardened by hardening light such as UV light, for example, by being left at room temperature, but has elasticity even after hardening. The elastic adhesive material AO enables dust-proofing and water-proofing for the emission opening 41o. The guard 43a surrounding the emission opening 41O protrudes downward the bottom plate member 41d and is highly likely to contact an external object and is highly likely to receive impact from outside. For this reason, the elastic adhesive material AO is provided between the emission surface 22c of the prism mirror 22 and the emission opening 41O of the barrel 41 for sealing, so that the emission surface 22c of the prism mirror 22 and the like are provided with impact resistance, thereby facilitating maintenance of optical performances.

Referring to FIG. 6, in the barrel 41, the first display element 11a supported by the holder 31 is inserted into a space ISa facing the front plate member 41e from above via the insertion opening 41z and fixed in a positioned state. In this case, the first display element 11a is arranged in the barrel 41 and is less likely to be affected by impact from outside, and a situation in which misalignment occurs in position adjustment due to an operation error in a manufacturing process is less likely to occur.

Figure 10:
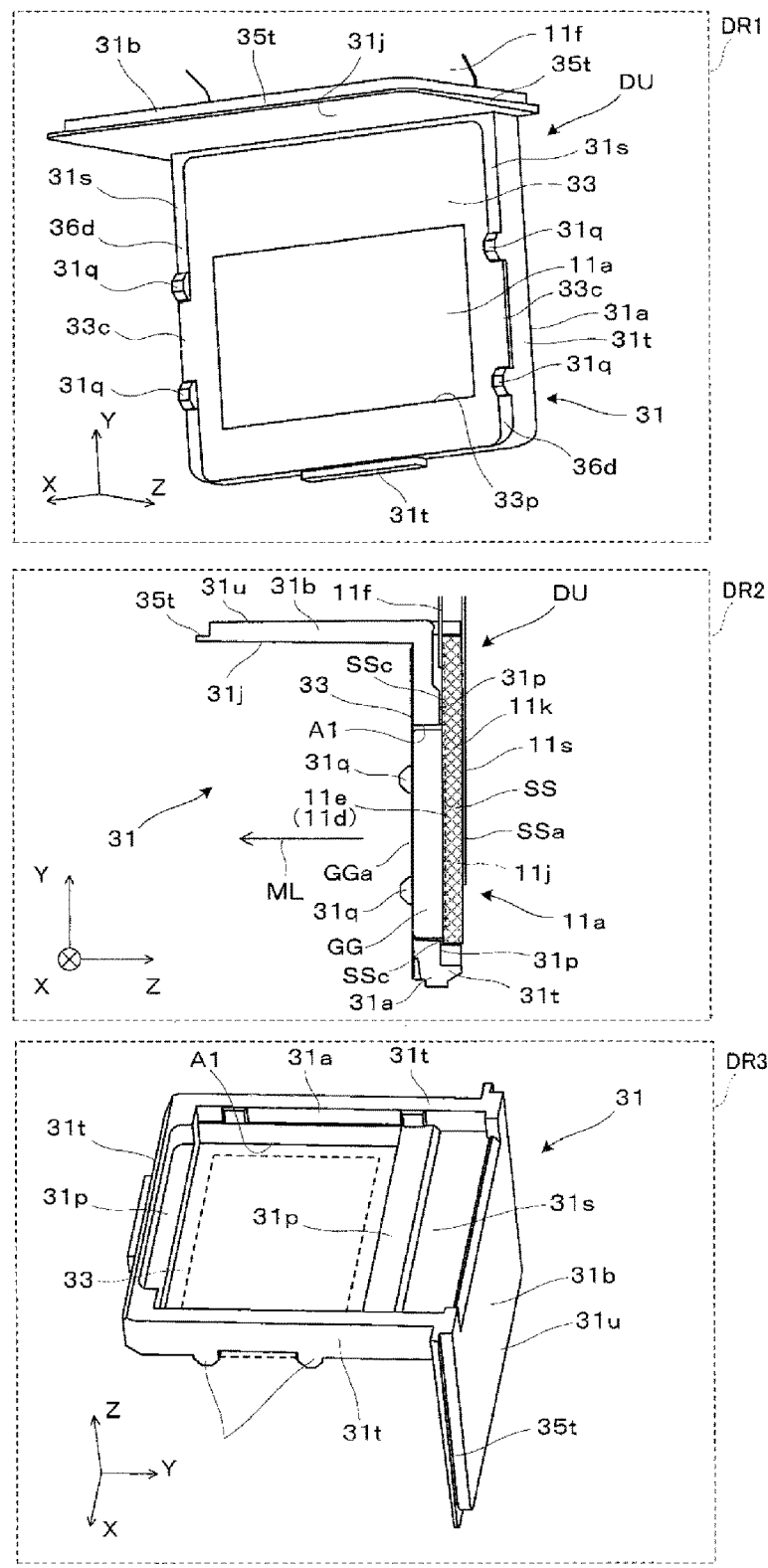
FIG. 10 illustrates a perspective view of a front side, a side cross-sectional view and a perspective view of a back side illustrating a display unit.

FIG. 10 illustrates diagrams for explaining a display unit DU in which the first display element 11a is assembled to the holder 31. In FIG. 10, a region DR1 includes a perspective view illustrating a front side of the display unit DU, a region DR2 includes a side cross section of the display unit DU, and a region DR3 includes a perspective view illustrating a back side of the holder 31.

In the display unit DU illustrated, the first display element 11a and an associated light-shielding plate 33 are fixed to the holder 31 and are aligned with each other.

The first display element 11a has a plate-shaped main body portion 11k and the flexible printed circuit (FPC) portion 11f that is coupled to an upper portion of the main body portion 11k and extends upward. In these portions, the main body portion 11k includes a silicon substrate SS in which a drive circuit 11j is formed and that forms an exterior of the main body portion 11k, a light emission layer 11e which is an organic EL element containing an organic EL material and generates light of a color needed for the image light ML, and a protective glass GG for sealing that seals the light emission layer 11e in cooperation with the silicon substrate SS. Here, the light emitting layer 11e corresponds to the display surface 11d. The first display element 11a emits the image light ML toward the protective glass GG side by performing light emission operation in accordance with a drive signal received from the FPC portion 11f. An elastic heat dissipation sheet 11s can be attached to a back surface SSa of the silicon substrate SS. The heat dissipation sheet 11s is made of graphite, for example, and is bonded to the back surface SSa of the silicon substrate SS using an adhesive material having high thermal conductivity. Although not illustrated, the heat dissipation sheet 11s is fixed to the first frame 52a (see FIG. 4) on a tip side, and has an effect of cooling the silicon substrate SS by heat conduction. The heat dissipation sheet 11s may have laminated structure in which a plurality of sheets are bonded together.

The holder 31 is a member formed of, for example, a resin having a light shielding property, and has an outer shape bent in an L-shape in side view. The holder 31 includes a support frame 31a that supports the first display element 11a, and the base plate 31b that is coupled to an upper portion of the support frame 31a and extends in a direction intersecting (specifically an orthogonal direction) the support frame 31a. The support frame 31a is inserted into the barrel 41 via the insertion opening 41z formed at the barrel 41 while supporting the first display element 11a. The base plate 31b is coupled to a root of the support frame 31a, extends forward (that is, the −Z side) corresponding to the light emission side, and is not inserted into the barrel 41. The support frame 31a has a rectangular outer shape and includes a flat plate portion 31s and a frame portion 31t. An upper end of the flat plate portion 31s is coupled to the base plate 31b. The frame portion 31t has a U shape and surrounds the first display element 11a from left and right directions and a lower direction. The support frame 31a has a rectangular opening A1 surrounded by the flat plate portion 31s and the frame portion 31t. The protective glass GG of the first display element 11a is arranged so as to be fitted into the opening A1. Inside the support frame 31a, two support regions 31p extending parallel to the lateral X direction are formed at an upper portion and a lower portion in the Y direction. The upper support region 31p is formed as a ridge on a back surface side of the flat plate portion 31s, and the lower support region 31p is formed as a step on a back surface side of the frame portion 31t. Both the support regions 31p are bonded to upper and lower surface regions SSc of the silicon substrate SS of the first display element 11a via adhesive materials. As a result, the first display element 11a is supported in a state of being indirectly positioned with respect to the support frame 31a, and the display surface 11d of the first display element 11a can be brought into a predetermined state of being positioned substantially parallel to the XY plane. The base plate 31b of the holder 31 has a rectangular flat outer shape, and a lower surface 31j extends in parallel with the YZ plane. The base plate 31b is placed at the holder pedestal 41s formed at the barrel cover 41u of the barrel 41, and is fixed to the holder pedestal 41s after positioning (see FIG. 6 and the like). As a result, the lower surface 31j which is a first surface formed at the base plate 31b and the bearing surface 41n which is a second surface formed at the holder pedestal 41s are opposed to each other, and a plane substantially parallel to the XZ plane obtained by extending the lower surface 31j which is the first surface formed at the base plate 31b intersects the upper portion 22j of the second optical member 2b and also intersects an upper portion of the third lens 21q. In an outer peripheral portion of the base plate 31b, a thin portion 35t is formed at three sides of a back side, that is, the −Z side, and lateral sides, that is, the ±X sides. An upper surface 31u of the base plate 31b is smooth and flat so as to facilitate support of a three dimensional driving device by an arm to be described later.

A process of fixing the first display element 11a to the support frame 31a of the holder 31 will be briefly described. Placement on a support jig (not illustrated) is performed with a front side or the −Z side of the support frame 31a facing down. As a result, a reference surface of the support jig abuts on an abutment surface 36d of the support frame 31a. Thereafter, an adhesive material is supplied to a front surface of the support region 31p, the first display element 11a with the protective glass GG facing down is lowered from above the support frame 31a, and the protective glass GG is inserted into the opening A1 of the support frame 31a. In this state, the reference surface of the support jig contacts a front surface GGa of the protective glass GG, and the first display element 11a is positioned with respect to the support frame 31a. Then, the adhesive material is hardened to fix the first display element 11a to the support frame 31a.

The light-shielding plate 33 is fixed to the support frame 31a of the holder 31 by using an adhesive material or a sticky material. The light-shielding plate 33 is a flare stop provided with a rectangular opening 33p, and is formed of a metal, a resin, or the like having light-shielding properties. Generation of stray light can be suppressed by the light-shielding plate 33. The effective image light ML emitted from the display surface 11d of the first display element 11a passes through the opening 33p without being shielded by the light-shielding plate 33. When the light-shielding plate 33 is fixed, four protrusions 31q formed at the support frame 31a can be used for positioning. The four protrusions 31q grasp protruding portions 33c formed on left and right sides of the light-shielding plate 33 from above and below, and the light-shielding plate 33 is appropriately positioned with respect to the support frame 31a. By using the plurality of protrusions 31q, the light-shielding plate 33 is easily fixed in a space-saving manner. The light-shielding plate 33 can be permanently fixed to the support frame 31a by using an adhesive material.

Figure 11:
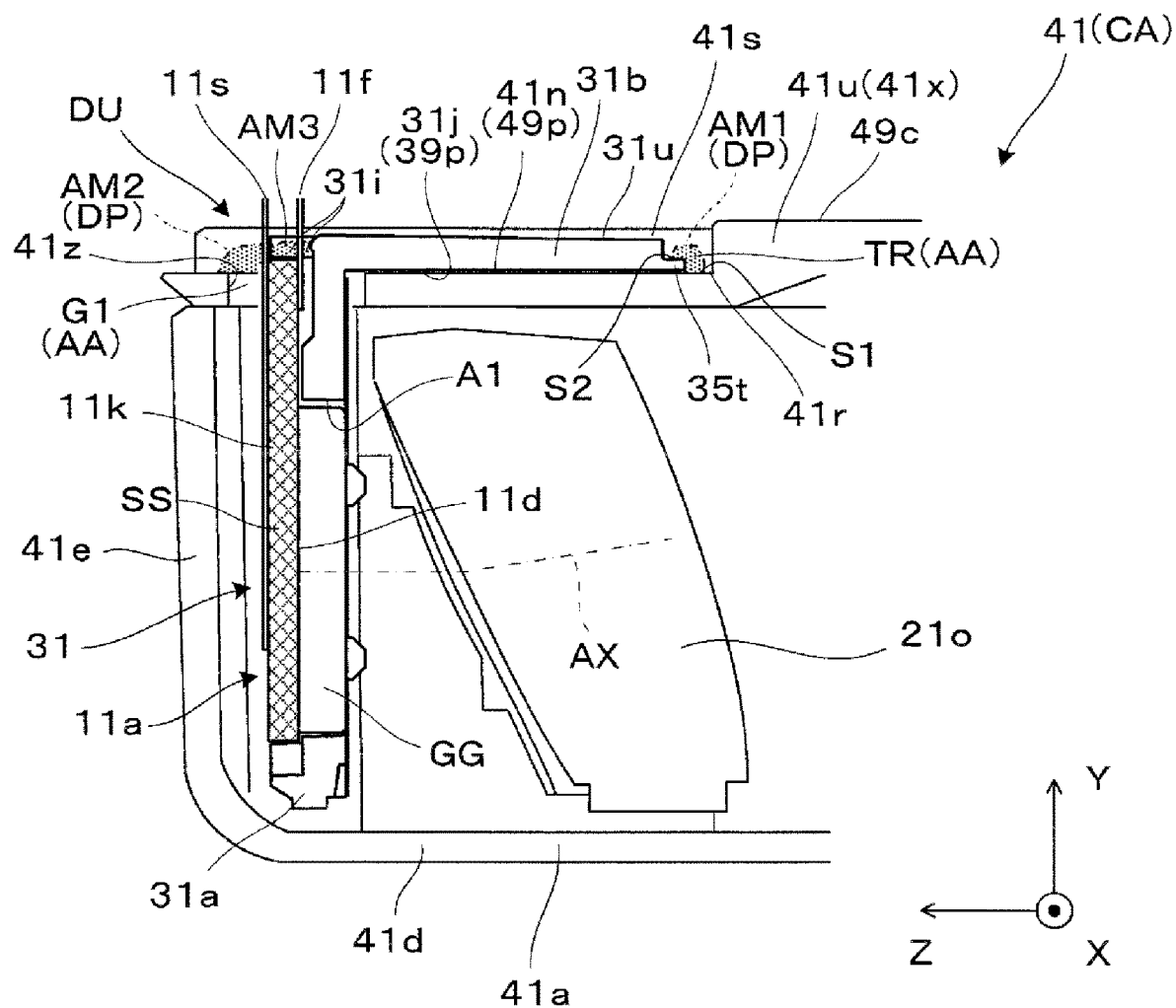
FIG. 11 is an enlarged cross-sectional view of a barrel front portion.
Figure 12:
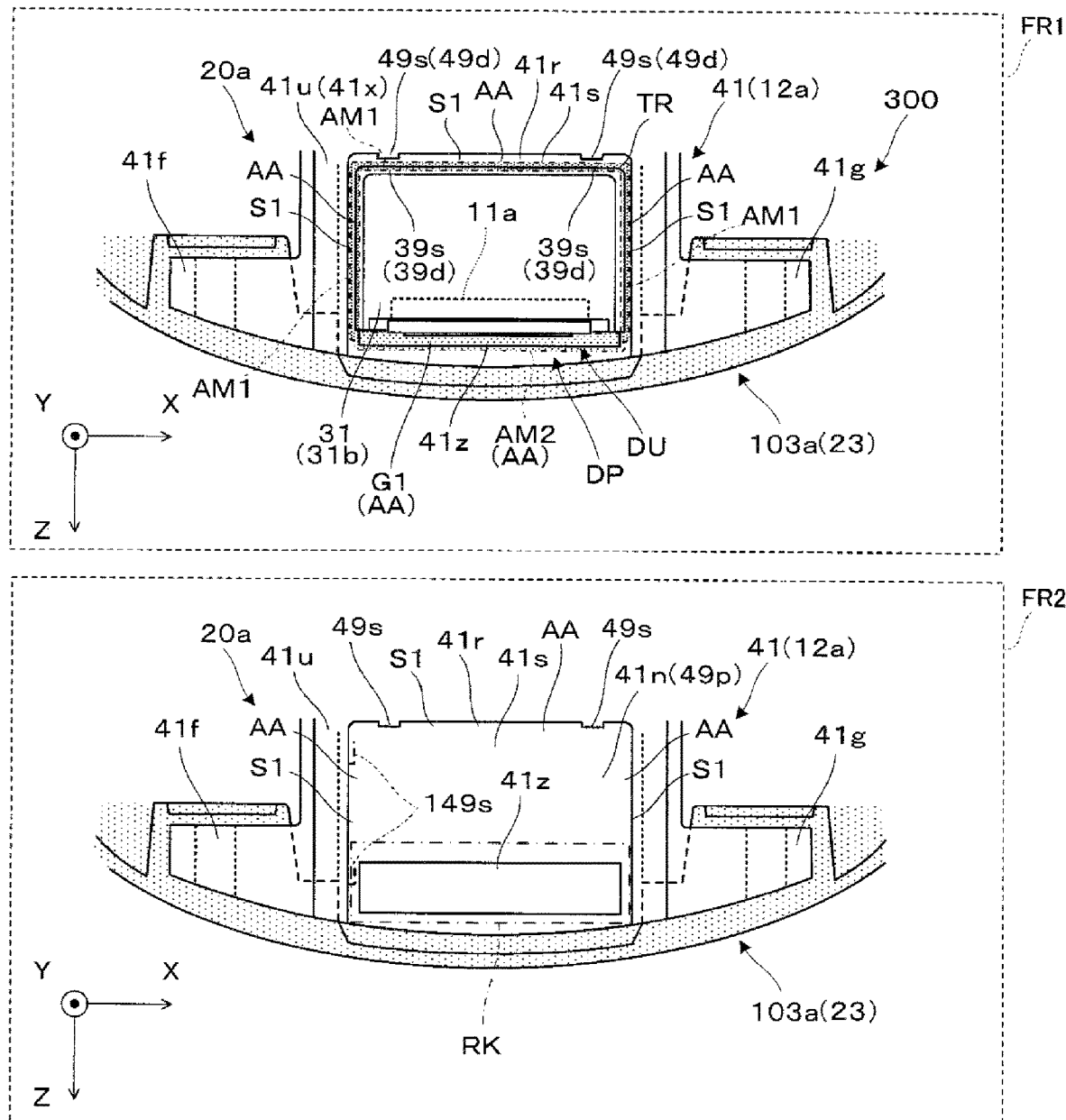
FIG. 12 illustrates plan views of an optical unit.

Fixing of the display unit DU to the barrel 41 will be described with reference to FIGS. 11 and 12. FIG. 11 is an enlarged cross-sectional view for explaining the optical unit 300, and FIG. 12 illustrates diagrams for explaining assembly of the optical unit 300. In FIG. 12, a region ER1 includes a plan view illustrating a state in which the display unit DU is assembled to the barrel 41, and a region ER2 includes a plan view illustrating a state before the display unit DU is assembled. Here, an assembly in which the display unit DU including the first display element 11a is assembled to the first display unit 20a in which the first projection optical system 12a including the barrel 41 and the first combiner 103a are combined is referred to as the optical unit 300.

A step S1 is formed at an edge portion 41r on left, right and back sides of the holder pedestal 41s formed at the top plate 41x of the barrel cover 41u, which is the upper surface of the barrel 41. That is, a height of an initial abutment surface 49p which is the upper surface or the bearing surface 41n of the holder pedestal 41s is less than a height of an upper surface 49c of the top plate 41x. The step S1 of the holder pedestal 41s and a vicinity thereof hold an adhesive material AM1 that couples the holder 31 and the barrel 41. The adhesive material AM1 is, for example, an acrylic ultraviolet curable resin. The adhesive material AM1 is hardened after positioning of the holder 31 described later.

When a lower end of the support frame 31a of the holder 31 of the display unit DU is inserted from the insertion opening 41z and the entire support frame 31a is caused to enter the barrel 41 together with the first display element 11a, the first display element 11a is housed in the space ISa and the base plate 31b is placed so as to be fitted into the recessed holder pedestal 41s. At this time, most of the insertion opening 41z is closed by the base plate 31b, thereby preventing dust and dirt from entering the holder 31.

Further, when the base plate 31b is placed on the holder pedestal 41s, the initial abutment surface 49p, which is the bearing surface 41n of the holder pedestal 41s, and an initial abutment surface 39p, which is the lower surface 31j of the base plate 31b, abuts on each other to bring about an initial positioning state in which a center of the display surface 11d of the first display element 11a is located at the same position as the optical axis AX toward the first lens 210 of the first optical member 2a or is lowered by a predetermined distance. That is, at the time of adjustment after the initial stage, the holder 31 can be moved in the upward +Y direction with respect to the barrel 41, and precise positioning in the Y direction can be performed by fine adjustment of a movement amount of the holder 31 in the +Y direction.

The base plate 31b of the holder 31 has the thin portion 35t at an edge portion on the left, right and back sides. The thin portion 35t forms a step S2 facing the step S1 of the holder pedestal 41s. As a result, a trench TR is formed by the step S1 provided at the holder pedestal 41s of the barrel cover 41u and the step S2 provided at the thin portion 35t of the holder 31. The trench TR is a part of an adhesive material application portion AA, and has a role of holding the adhesive material AM1 around the thin portion 35t of the base plate 31b to prevent unintended diffusion. That is, the steps S1 and S2 can be said to be diffusion prevention walls. When positioning the holder 31, which will be described later, the holder 31 is slightly displaced. With such displacement of the holder 31, an application state of the adhesive material AM1 becomes coarse or dense, and at a dense position, the adhesive material AM1 may protrude to a periphery of the holder 31 (that is, the upper surface 31u) or the adhesive material AM1 may protrude outside the holder pedestal 41s, which may hinder subsequent adjustment or handling. In order to prevent this, the trench TR is provided so as to stop the adhesive material AM1 in a necessary region. Note that, in particular, viscosity of the adhesive material AM1 was set to 5000 to 50000 mPa·s. Further, a wall thickness of the base plate 31b is about 1 mm, and a thickness of the thin portion 35t is about 0.5 mm. A movement amount for positioning the base plate 31b is about 0.5 mm and does not exceed 1 mm.

Referring to FIG. 12, an edge portion on the −Z side of the holder pedestal 41s formed at the barrel cover 41u is provided with two protrusions 49s protruding to the forward +Z side from a side surface of the step S1. The two protrusions 49s abut on two corresponding points 39s of the thin portion 35t formed at the edge portion on the −Z side of the base plate 31b of the holder 31. Initial abutment points 39d, which are corresponding point 39s at a rear end of the holder 31, and initial abutment points 49d, which are the two protrusions 49s of the holder pedestal 41s of the barrel cover 41u, abut on each other to bring about initial positioning state in which the holder 31 is positioned with respect to the barrel cover 41u. In this case, a distance from the display surface 11d of the first display element 11a to the first lens 210 of the first optical member 2a illustrated in FIG. 11 is slightly shorter than an original proper distance. That is, at the time of adjustment after the initial stage, the holder 31 can be moved in the +Z direction with respect to the barrel 41, and precise positioning in the Z direction can be performed by fine adjustment of a movement amount of the holder 31 in the +Z direction.

The protrusion 49s for the initial positioning is not limited to being provided at the edge portion on the −Z side of the holder pedestal 41s, and as illustrated in the region ER2 of FIG. 12, instead of or in addition to the protrusions 49s, a pair of protrusions 149s can be provided at the edge portion on any of the ±X sides of the holder pedestal 41s.

In order to allow a position of the base plate 31b of the holder 31 to be slightly moved in the X direction and the Z direction inside the insertion opening 41z, an outline of the insertion opening 41z in plan view is made larger by one size than an outline of the base plate 31b and the first display element 11a in plan view. That is, the insertion opening 41z has a size including an adjustment margin for allowing the support frame 31a to move in a normal direction of the display surface 11d of the first display element 11a and in a lateral direction perpendicular to the normal direction. Accordingly, the space ISa for housing the first display element 11a and the support frame 31a is configured to avoid interference with the first display element 11a and the like and allow minute movement of the first display element 11a and the like. As a result, in a front upper portion of the holder 31, that is, on the front +Z side of a joint between the base plate 31b and the support frame 31a, a state is created in which the insertion opening 41z is partially opened to form a gap G1. Thus, before the holder 31 is positioned and fixed to the barrel 41, an adhesive material AM2 as a sealing portion is applied to a space between a front end of the insertion opening 41z and the silicon substrate SS of the first display element 11a or the heat dissipation sheet 11s so as to fill the space, so as to cover the gap G1, and the adhesive material AM2 is hardened after the holder 31 is positioned as described later. The adhesive material AM2 has relatively high viscosity before being hardened and a shape thereof can be easily maintained. When the adhesive material AM1 corresponding to the trench TR and the adhesive material AM2 corresponding to the gap G1 are combined, a closed shape like four sides of a rectangle is obtained. The combination of both the adhesive materials AM1 and AM2 is called the dust-proof structure DP. The dust-proof structure DP achieves fixation between the holder 31 and the barrel 41 while ensuring dust-proofing between the holder 31 and the barrel 41. The adhesive materials AM1 and AM2 of the dust-proof structure DP extend along a periphery of the base plate 31b and protrude to the holder pedestal 41s. The dust-proof structure DP is a sealing member that is formed of a photocurable resin and maintains a state in which the holder 31 is positioned with respect to the barrel 41. The adhesive materials AM1 and AM2 are desirably materials having small hardening shrinkage. Portions (the trench TR and the gap G1) to which the adhesive materials AM1 and AM2 constituting the dust-proof structure DP are applied are the adhesive material application portions AA. Note that in the holder 31, when a gap 31i is formed around an outlet of the FPC unit 11f, an adhesive material AM3 can be applied and filled around the gap 31i for the purpose of ensuring dust-proofing and water-proofing.

Note that as illustrated in the region ER2 of FIG. 12, a seal RK may be attached in advance to the upper surface of the barrel 41 so as to seal the insertion opening 41z. By peeling off the seal RK immediately before the base plate 31b of the holder 31 is inserted into the insertion opening 41z, it is possible to reliably prevent dust and dirt from entering the barrel 41.

Figure 13:
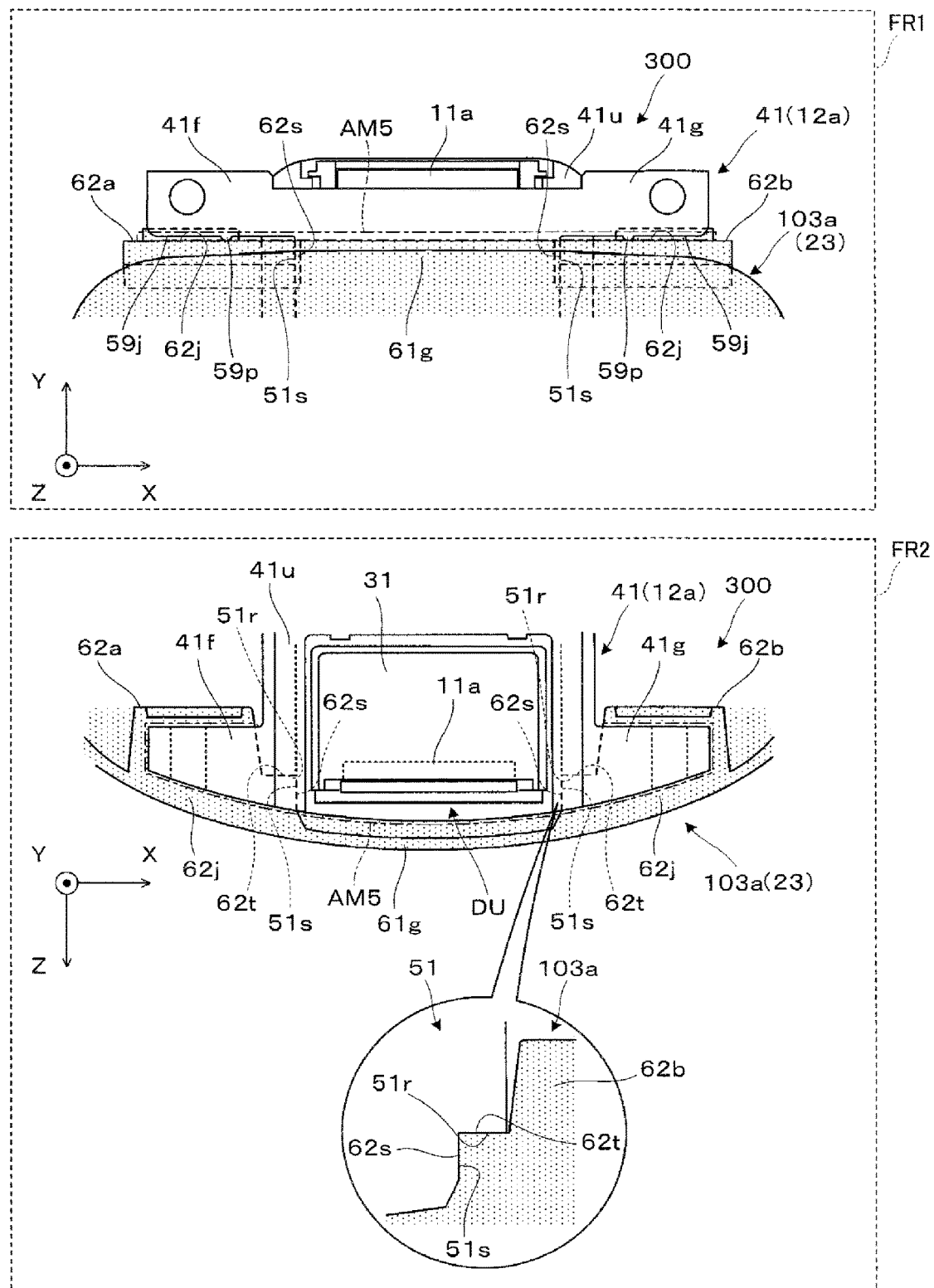
FIG. 13 illustrates a front view and a plan view of the optical unit.

With reference to FIG. 13, fixing of the first combiner 103a to the barrel 41, that is, fixing of the see-through mirror 23 to the first projection optical system 12a will be described. In FIG. 13, a region FR1 illustrates a front view of the barrel 41 and the first combiner 103a, and a region FR2 illustrates a plan view of the barrel 41 and the first combiner 103a.

In the optical unit 300, the pair of protruding portions 41f and 41g are formed in front of the barrel 41 so as to protrude outward in a lateral direction. Further, a pair of attachment portions 62a and 62b are formed at an upper end 61g of the first combiner 103a so as to protrude inward, that is, to the −Z side. A pair of opposed inner side surfaces 62s of the pair of attachment portions 62a and 62b are fitted to a pair of outward lateral side surfaces 51s of the barrel 41 so as to sandwich the pair of lateral side surfaces 51s, and positioning in the ±X direction is performed so as to reduce inclination. A pair of rear side surfaces 62t of the pair of attachment portions 62a and 62b abut on a pair of stepped front side surfaces 51r of the barrel 41, and positioning in the ±Z direction is performed so as to reduce inclination. Further, a plurality of convex portions 59p protruding from a bottom surface 59j of the pair of protruding portions 41f and 41g abut on a pair of upper surfaces 62j of the pair of attachment portions 62a and 62b, and positioning in the ±Y direction is performed. After the above-described positioning, that is, after the positioning of six axes, an adhesive material AM5 is supplied from a periphery between the bottom surface 59j of the protrusion portions 41f and 41g and the upper surface 62j of the attachment portions 62a and 62b, and the supplied adhesive material AM5 is hardened by ultraviolet rays or the like, thereby completing the fixing of the first combiner 103a to the barrel 41.

The fixing of the first combiner 103a to the barrel 41 is performed before the holder 31 is fixed to the barrel 41. Conversely, when the fixing of the holder 31 precedes the fixing of the first combiner 103a, the positioning of the holder 31 is performed with respect to the first projection optical system 12a.

Figure 14:
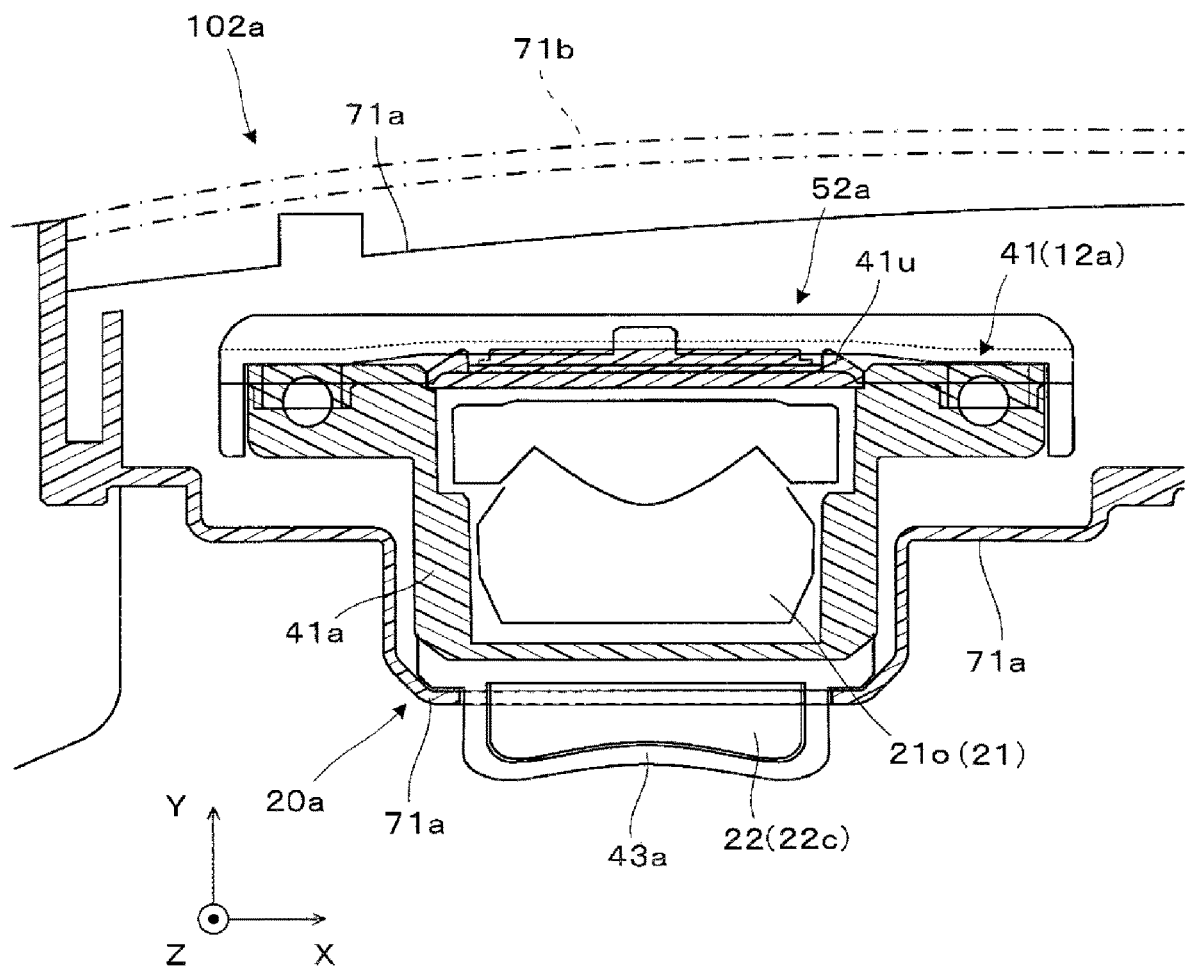
FIG. 14 is a conceptual view for explaining front cross-sectional structure of the display device on the one side.

FIG. 14 is a front cross-sectional view of the first display driving unit 102a of the first display device 100A illustrated in FIG. 1. The first frame 52a is fixed to the barrel 41. The first frame 52a supports the first display unit 20a including the barrel 41 and determines an arrangement thereof. A lower cover 71a is arranged so as to cover a lower side of the barrel 41. The lower cover 71a is supported by the joint 50c and the first frame 52a illustrated in FIG. 4, and is linked to the support device 100C illustrated in FIG. 1 at an end portion on a left side in the figure. An upper cover 71b is detachably attached to the lower cover 71a.

Figure 15:
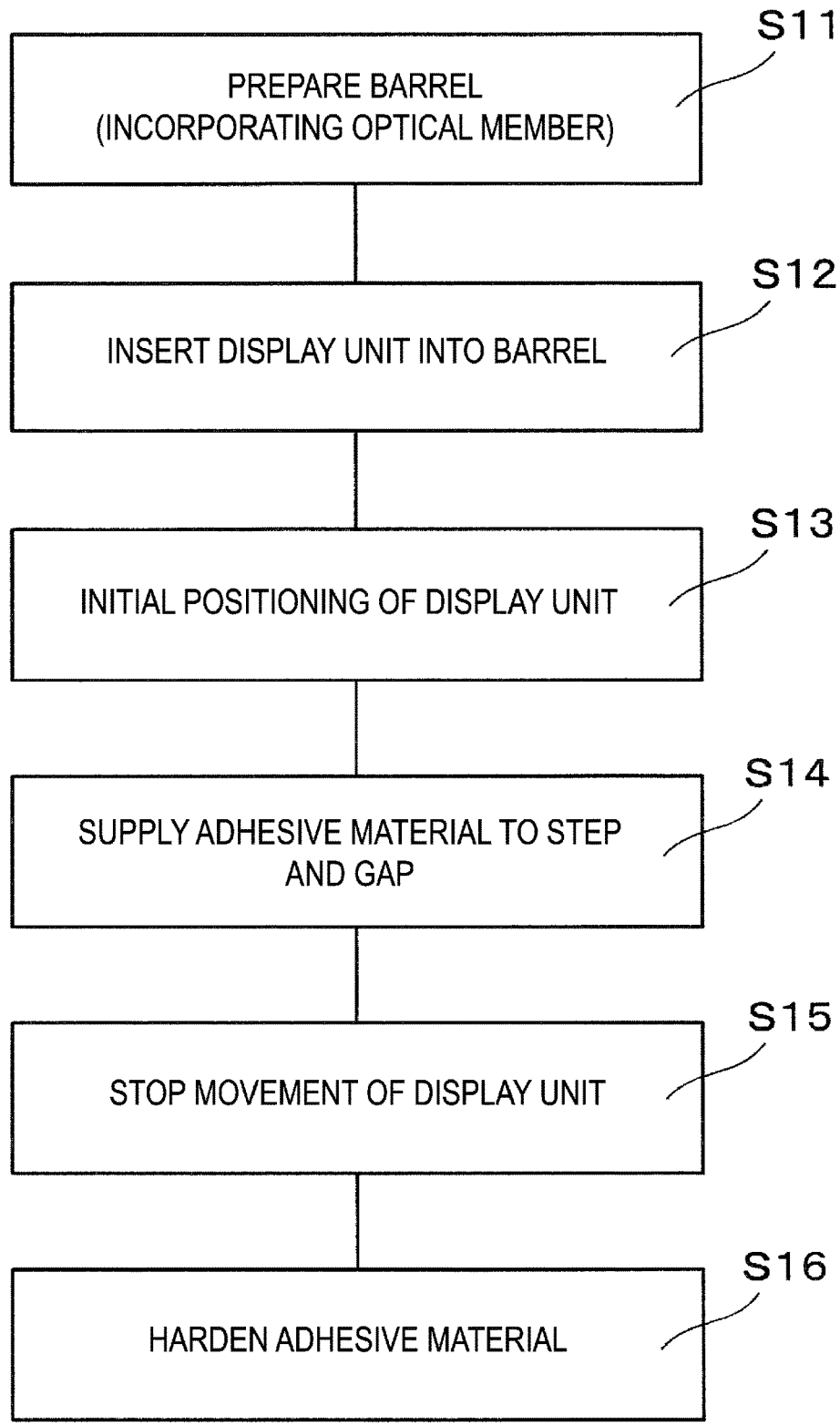
FIG. 15 is a diagram for explaining a method of assembling the display unit to the barrel.
Figure 16:
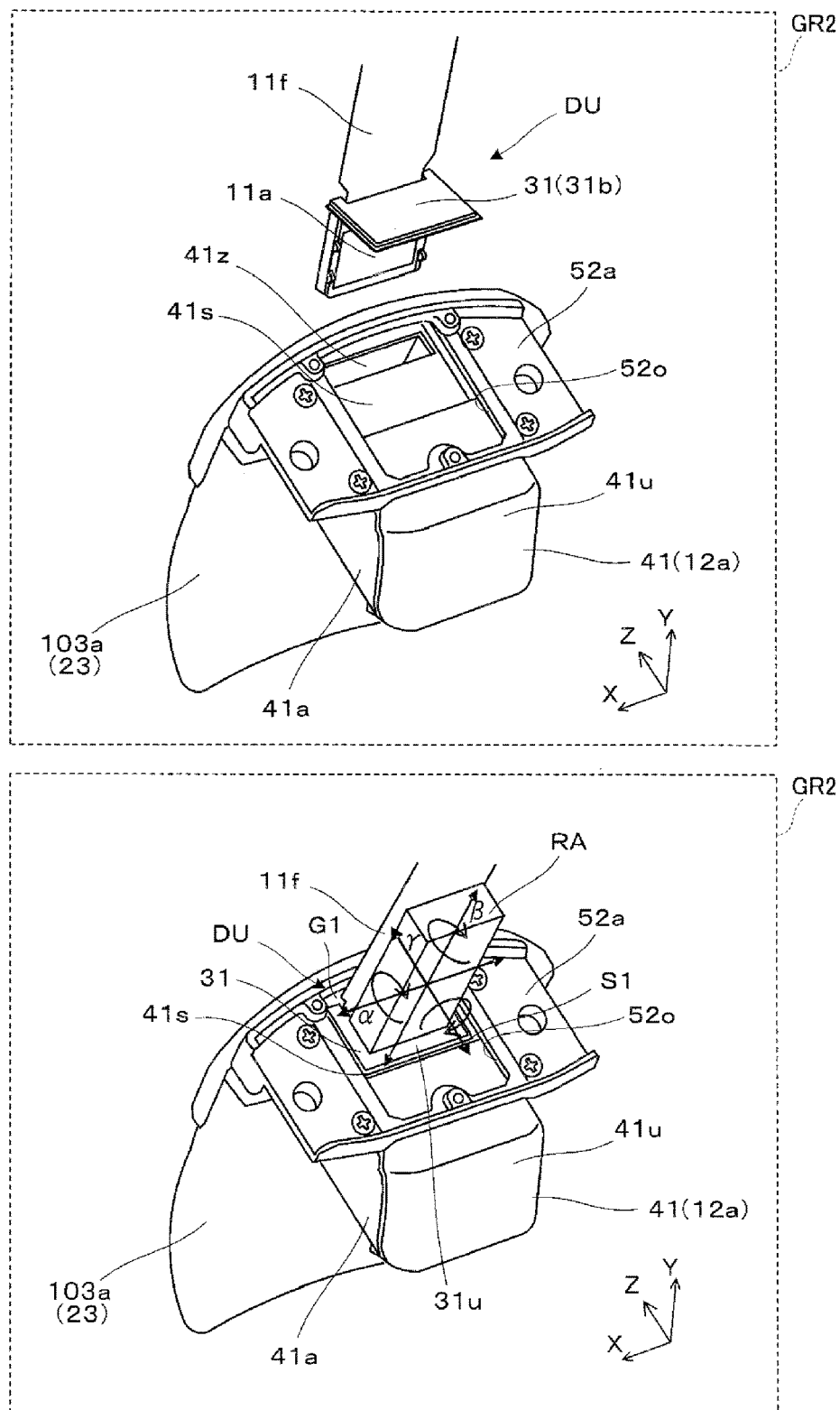
FIG. 16 illustrates perspective views for explaining assembly of the display unit to the barrel.

A method of assembling the display unit DU to the barrel 41, which is a manufacturing method of the optical unit 300, will be described with reference to FIGS. 15 and 16. In FIG. 16, a region GR1 includes a perspective view illustrating a state before the display unit DU is assembled to the barrel 41, and a region GR2 includes a perspective view illustrating a state during the assembly of the display unit DU.

The barrel 41 incorporating the optical members 2a and 2b is prepared (step S11). The first lens 21o, the second lens 21p, the third lens 21q and the prism mirror 22 are positioned to the barrel body 41a and fixed by adhesion. Thereafter, the barrel cover 41u is airtightly fixed to the barrel body 41a by adhesion. At this stage, the barrel 41 is in a sealed state except for the insertion opening 41z. In the example illustrated in the region GR1 of FIG. 16, the first combiner 103a is fixed to a front portion of the barrel 41, and the first frame 52a is attached to the upper portion of the barrel 41. Next, the display unit DU is inserted into the barrel 41 (step S12). That is, the holder 31 is inserted into the insertion opening 41z of the barrel 41. To be specific, the support frame 31a of the holder 31 constituting the display unit DU is inserted into the insertion opening 41z together with the first display element 11a. At this time, the base plate 31b of the holder 31 is placed above the holder pedestal 41s of the barrel cover 41u. In this case, at an initial stage of attaching the holder 31 to the barrel 41, the insertion opening 41z is substantially closed, and it becomes easy to secure dust-proofing in the barrel 41. When the holder 31 is pressed in the backward −Z direction in this state, the two protrusions 49s provided at the barrel 41 and the two corresponding points 39s provided at the holder 31 abut on each other in a state in which the bearing surface 41n which is a front surface of the holder pedestal 41s provided at the barrel 41 and the lower surface 31j of the base plate 31b provided at the holder 31 abut on each other. As a result, the initial positioning is achieved (step S13). In this case, the holder 31 can be loosely positioned at the initial stage of attaching the holder 31 to the barrel 41. After the initial positioning, the adhesive material AM1 is supplied to the step S1 provided at the edge portion on the three sides of the holder pedestal 41s, and the adhesive material AM2 is supplied as the sealing portion so as to close the gap G1 remaining at the insertion opening 41z of the barrel cover 41u (step S14). Thereafter, the upper surface 31u of the base plate 31b of the holder 31 is held by an arm RA of the three dimensional driving device to support the holder 31. An image forming state is observed while posture of the holder 31 is adjusted with the six axes by the arm RA, and movement of the holder 31 or the display unit DU is stopped in a state in which aberration is reduced to such an extent that desired optical performance can be achieved (step S15). Note that as illustrated in the region GR2 of FIG. 16, the arm RA supports the upper surface 31u of the holder 31 and is capable of moving the holder 31 in directions of three axes α, β and γ and rotating the holder 31 about the three axes α, β and γ. Thereafter, the adhesive materials AM1 and AM2 supplied to the step S1 and the like are irradiated with ultraviolet light to harden the adhesive materials AM1 and AM2 (step S16). That is, the base plate 31b is fixed to the holder pedestal 41s provided in a vicinity of the insertion opening 41z of the barrel 41 by the adhesive materials AM1 and AM2. In the above description, the process of supplying the adhesive material AM1 to the step S1 of the holder pedestal 41s and supplying the adhesive material AM2 to be adjacent to the insertion opening 41z may be performed before the process of inserting the display unit DU into the barrel 41.

In the process of adjusting the posture of the holder 31, the inside of the barrel 41 is sealed by the adhesive materials AM1 and AM2, and the first display element 11a can be assembled to the optical unit 300 in consideration of dust-proofing.

In the above description, the direction in which the holder 31 is moved by the arm RA is mainly the γ direction parallel to the optical axis AX. Therefore, the base plate 31b moves mainly in a horizontal direction therealong (to be specific, in the ±Z direction), so that it is easy to secure a space for positioning, and it is easy to downsize the barrel 41 and the optical unit 300.

By performing the initial positioning of the holder 31, it is possible to reduce a burden when the posture is adjusted with the six axes. In addition, by performing the initial positioning, it is possible to omit adjustment of movement or rotation with respect to an axis having a low influence degree. That is, it is possible to perform simple posture adjustment by reducing the number of adjustment axes from the posture adjustment with the six axes. To be more specific, the adjustment of the rotation around the β-axis or the Y-axis can be omitted by the initial positioning using the two protrusions 49s provided at the barrel 41.

The HMD 200 of the first exemplary embodiment described above includes the first display element 11a, the holder 31 configured to hold the first display element 11a, the first projection optical system 12a configured to project an image formed on the first display element 11a, the barrel 41 which is the case CA configured to house the first projection optical system 12a in a positioned state, and the dust-proof structure DP configured to achieve fixing of the holder 31 and the barrel 41 while ensuring dust-proofing of the holder 31 and the barrel 41, wherein the holder 31 includes the support frame 31a inserted into the barrel 41 through the insertion opening 41z formed at the barrel 41 while supporting the first display element 11a, and the base plate 31b coupled to the root of the support frame 31a, the barrel 41 includes the holder pedestal 41s facing the base plate 31b, and the dust-proof structure DP includes the adhesive material extending along a periphery of the base plate 31b and protruding to the holder pedestal 41s.

In the above-described HMD 200, since the barrel 41 includes the holder pedestal 41s facing the base plate 31b, and the dust-proof structure DP includes the adhesive material extending along the periphery of the base plate 31b and protruding to the holder pedestal 41s, and by the base plate 31b and the adhesive material, the first display element 11a can be arranged in the barrel 41 while closing the insertion opening 41z of the barrel 41, and the first display element 11a can be fixed together with the holder 31. Thus, the first display element 11a can be positioned while at least partially closing the insertion opening 41z, and miniaturization of the HMD 200 can be achieved.

Second Exemplary Embodiment

The HMD of the first exemplary embodiment will be described below. Note that an HMD of a second exemplary embodiment is obtained by modifying a part of the HMD of the first exemplary embodiment, and description of common parts to the HMD of the first exemplary embodiment will be omitted.

Figure 17:
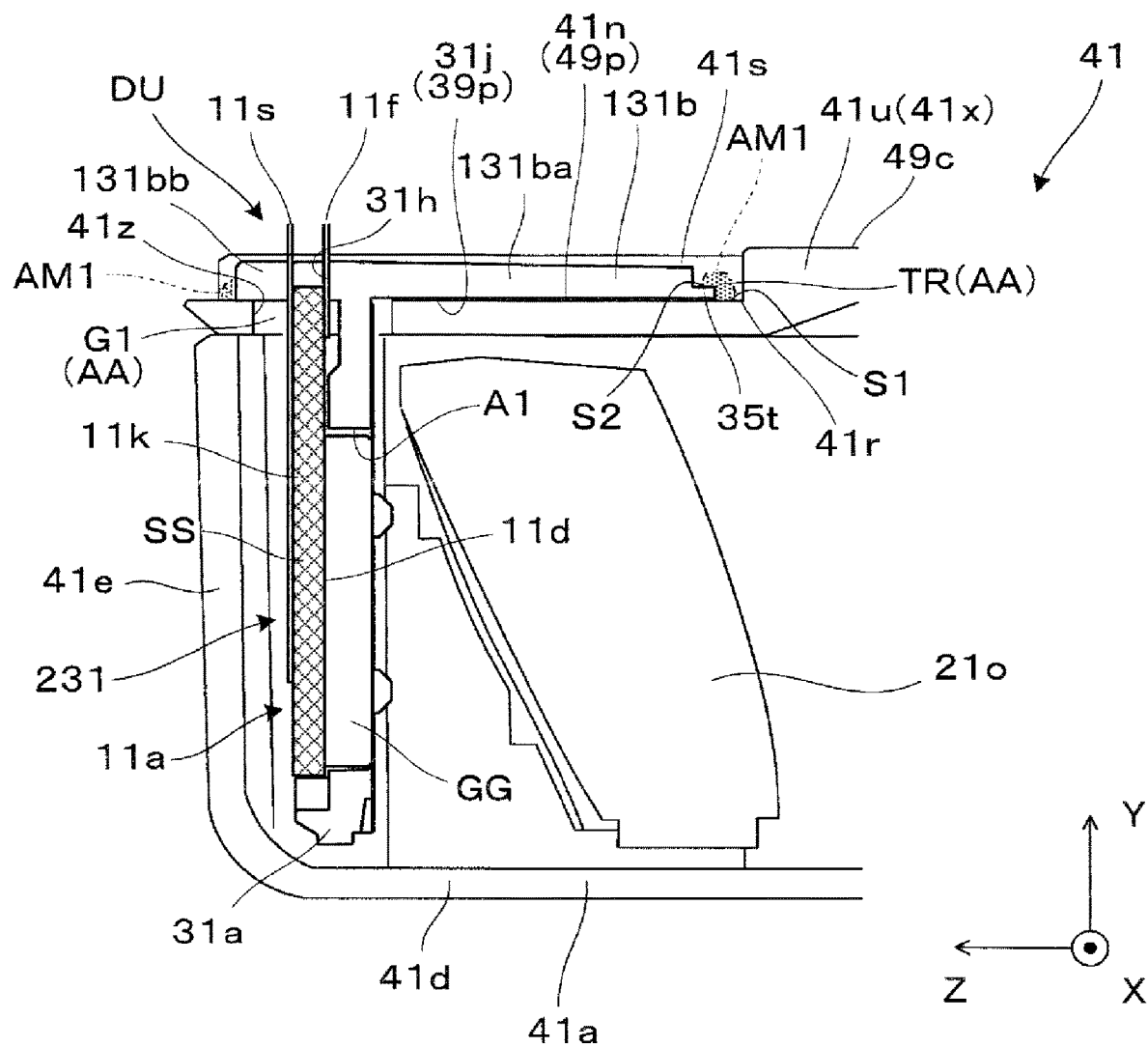
FIG. 17 is a partially enlarged cross-sectional view for explaining a display unit in a second exemplary embodiment.

As illustrated in FIG. 17, a holder 231 has a T-shaped outer shape in side view. The holder 231 includes the support frame 31a that supports the first display element 11a, and a base plate 131b that is coupled to the upper portion of the support frame 31a and extends in a direction orthogonal to the support frame 31a. The base plate 131b includes a first member 131ba extending to a front side which is the light emission side or the −Z side of the first display element 11a and a second member 131bb extending to a rear side which is an opposite side to the light emission side or the +Z side of the first display element 11a. The first member 131ba has a shape similar to that of the base plate 31b of the holder 31 of the first exemplary embodiment and functions similarly. On the other hand, the second member 131bb is supported by an end portion on the +Z side of the holder pedestal 41s. Therefore, when the display unit DU or the holder 231 is assembled to the barrel 41, the support frame 31a or the first display element 11a is more easily prevented from being inclined with respect to the optical axis AX. Further, the second member 131bb closes the gap G1 remaining on the +Z side of the insertion opening 41z. That is, the base plate 131b is shaped to cover the insertion opening 41z. As a result, the insertion opening 41z can be entirely closed at the stage where the holder 231 is inserted into the barrel 41, thereby enhancing the dust-proof effect.

The FPC unit 11f and the heat dissipation sheet 11s extend outward the barrel 41 through a hole 31h formed at the second member 131bb. An adhesive material can be applied and filled around the hole 31h for the purpose of ensuring dust-proofing and water-proofing.

In the T-shaped holder 231, the base plate 131b extends to the outside of the insertion opening 41z in plan view, and an area of the base plate 131b is greater than an area of the insertion opening 41z.

When the T-shaped holder 231 is used, the adhesive material AM is supplied to an edge portion on four sides surrounding an entire periphery of the rectangular base plate 131b.

In the HMD 200 of the first exemplary embodiment described above, the base plate 131b extends to a front side corresponding to the light emission side of the first display element 11a and to an opposite rear side. In this case, the base plate 131b and the side surface portion SP of the barrel 41 extend substantially parallel to each other, and it is possible to prevent the base plate 131b from becoming bulky after assembly while increasing an area of the base plate 131b. In addition, the base plate 131b (that is, the second member 131bb) extending to a back side of the first display element 11a entirely closes the insertion opening 41z, thereby enhancing the dust-proof effect.

Modifications and Others

Although the present disclosure has been described with reference to the above embodiments, the present disclosure is not limited to the above embodiments and can be implemented in various modes without departing from the spirit of the disclosure. For example, the following modifications are possible.

Although the HMD 200 includes the first display device 100A and the second display device 100B in the above description, the HMD 200 or the image display device 100 may be configured such that the single first display device 100A or second display device 100B is supported in front of the eye by the support device 100C.

In the above description, the support frame 31a and the base plate 31b extend in the directions orthogonal to each other, however, the support frame 31a and the base plate 31b are not limited to being orthogonal to each other, and may be bent to extend in directions intersecting with each other.

The size of the base plate 31b is about the same as that of the support frame 31a, but may be about half or less of the size of the support frame 31a.

The shape of the base plate 31b is not limited to a rectangle, but may be various shapes such as a circle, an ellipse and a polygon.

The steps S1 and S2 can be replaced with other structure that can limit movement of the adhesive materials AM1 and AM2, and can be replaced with, for example, a ridge.

The optical members 2a and 2b of the first projection optical system 12a are not limited to those illustrated in the figures, and for example, the number of the optical elements constituting the first optical member 2a and the shape of the optical surface can be appropriately changed in accordance with the purpose of use of the HMD 200 and the like.

In the description above, although it has been assumed that the HMD 200 is worn on the head and is used, the above image display device 100 may also be used as a handheld display that is not worn on the head and is to be looked into like binoculars. In other words, the head-mounted display also includes a hand-held display in the present disclosure.

A head-mounted display apparatus in a specific aspect includes a display element, a holder configured to hold the display element, a projection optical system configured to project an image formed on the display element, and a case configured to house the projection optical system in a positioned state, wherein the holder includes a support frame inserted into the case through an insertion opening formed at the case while supporting the display element, and a base plate coupled to a root of the support frame, the case includes a holder pedestal facing the base plate, and a dust-proof structure includes an adhesive material extending along a periphery of the base plate and protruding to the holder pedestal.

In the above-described head-mounted display apparatus, since the case includes the holder pedestal facing the base plate, and the dust-proof structure includes the adhesive material extending along the periphery of the base plate and protruding to the holder pedestal, and by the base plate and the adhesive material, the display element can be arranged in the case while closing the insertion opening of the case, and the display element can be fixed together with the holder. With this, it is possible to position the display element while at least partially closing the insertion opening, and it is possible to achieve miniaturization of the head-mounted display apparatus.

The head-mounted display apparatus in a specific aspect includes a dust-proof structure configured to achieve fixing of the holder and the case while ensuring dust-proofing of the holder and the case.

In the head-mounted display apparatus in a specific aspect, the dust-proof structure includes a sealing member that is formed of a photocurable resin and maintains a state in which the holder is positioned with respect to the case. In this case, positioning of the display element is also achieved by the sealing member which is the dust-proof structure, and positioning structure can be made simple and highly accurate.

In the head-mounted display apparatus in a specific aspect, the case includes a container-shaped main body including a bottom plate member and a side wall, and a cover provided with an insertion opening and configured to cover an inside of the main body to form a housing space, the projection optical system includes a first optical member arranged on a light emission side of the display element, and a second optical member arranged on a light emission side of the first optical member and configured to bend an optical path by a reflection surface, an emission surface of the second optical member is exposed to an emission opening formed at the bottom plate member of the main body, and the dust-proof structure includes a sealing member that seals a coupling portion between the main body and the cover, and seals a gap between the emission opening of the main body and a periphery of the emission surface of the second optical member. In this case, when the case includes the main body and the cover, the coupling portion therebetween can be sealed by the dust-proof structure, and when the case exposes the emission surface at the emission opening, the emission opening can be sealed by the dust-proof structure.

In the head-mounted display apparatus in a specific aspect, the sealing member seals the gap between the emission opening of the main body and the periphery of the emission surface of the second optical member with an elastic adhesive material. In this case, the case can impart impact resistance to the second optical member and the like around the emission opening, and optical performance can be easily maintained.

In the head-mounted display apparatus in a specific aspect, a first surface formed at the base plate and a second surface formed at a pedestal face each other, and a plane obtained by extending the first surface intersects the second optical member. In this case, the holder pedestal is formed at a position recessed toward a center in the case, so that an amount of protrusion of the base plate of the holder can be suppressed.

In the head-mounted display apparatus in a specific aspect, the insertion opening has a size including an adjustment margin for allowing the support frame to move in a normal direction of a display surface of the display element.

In the head-mounted display apparatus in a specific aspect, the dust-proof structure includes a step that holds an adhesive material protruding to a periphery of the base plate of the holder due to positioning of the holder and prevents diffusion. In this case, it becomes easy to hold the adhesive material near the holder.

In the head-mounted display apparatus in a specific aspect, the dust-proof structure includes a step that holds an adhesive material protruding to a periphery of the holder pedestal of the case due to positioning of the holder and prevents diffusion. In this case, it becomes easy to hold the adhesive material by the holder pedestal.

An optical unit in a specific aspect includes a display element, a holder configured to hold the display element, a projection optical system configured to project an image formed on the display element, a case configured to house the projection optical system in a positioned state, and a dust-proof structure configured to achieve fixing of the holder and the case while ensuring dust-proofing of the holder and the case, wherein the holder includes a support frame inserted into the case through an insertion opening formed at the case while supporting the display element, and a base plate coupled to a root of the support frame, the case includes a holder pedestal facing the base plate, and the dust-proof structure includes an adhesive material extending along a periphery of the base plate and protruding to the holder pedestal.

The optical unit in a specific aspect includes a dust-proof structure configured to achieve fixing of the holder and the case while ensuring dust-proofing of the holder and the case.

A manufacturing method of an optical unit in a specific aspect is a manufacturing method of an optical unit in which a holder for holding a display element is fixed to a case for housing a projection optical system in a positioned state, the holder including a support frame inserted into the case through an insertion opening formed at the case while supporting the display element, and a base plate coupled to a root of the support frame, the manufacturing method including inserting the support frame into the insertion opening formed at the case, and fixing the base plate by an adhesive material to a holder pedestal provided near the insertion opening of the case.

In the method of manufacturing the optical unit described above, since the support frame is inserted into the insertion opening formed at the case and the base plate is fixed to the holder pedestal provided near the insertion opening of the case by the adhesive material, and by the base plate and the adhesive material, the display element can be arranged in the case while closing the insertion opening of the case, and the display element can be fixed together with the holder. This enables reliable dust-proofing by the space-saving dust-proof structure, and miniaturization of the head-mounted display apparatus can be achieved.

What is claimed is:

1. A head-mounted display apparatus, comprising:
    a display element;
    a holder configured to hold the display element;
    a projection optical system configured to project an image formed on the display element; and
    a case configured to house the projection optical system in a positioned state, wherein
    the display element includes a plate-shaped main body and a flexible printed circuit portion coupled to an upper portion of the plate-shaped main body,
    the holder includes a support frame inserted into the case through an insertion opening formed at the case while supporting the display element, and a base plate coupled to a root of the support frame,
    the case includes a holder pedestal facing the base plate, and
    a dust-proof structure includes an adhesive material extending along a periphery of the base plate and protruding to the holder pedestal,
    wherein the display element supported by the holder is configured to be inserted into an inner space of the case from an upper side of the case via the insertion opening and be fixed in the positioned state, and
    when the display element is fixed in the positioned state, the flexible printed circuit portion extends upward and out of the insertion opening, and the support frame of the holder is located in the inner space of the case and extends in parallel to the plate-shaped main body of the display element.

2. The head-mounted display apparatus according to claim 1, wherein the dust-proof structure is configured to achieve fixing of the holder and the case while ensuring dust-proofing of the holder and the case.

3. The head-mounted display apparatus according to claim 2, wherein the dust-proof structure includes a sealing member that is formed of a photocurable resin and maintains a state in which the holder is positioned with respect to the case.

4. The head-mounted display apparatus according to claim 2, wherein
    the case includes a container-shaped main body including a bottom plate member and a side wall, and a cover provided with the insertion opening and configured to cover an inside of the main body to form a housing space,
    the projection optical system includes a first optical member arranged on a light emission side of the display element, and a second optical member arranged on a light emission side of the first optical member and configured to bend an optical path by a reflection surface,
    an emission surface of the second optical member is exposed to an emission opening formed at the bottom plate member of the main body, and
    the dust-proof structure includes a sealing member that seals a coupling portion between the main body and the cover, and seals a gap between the emission opening of the main body and a periphery of the emission surface of the second optical member.

5. The head-mounted display apparatus according to claim 4, wherein
    the sealing member seals the gap between the emission opening of the main body and the periphery of the emission surface of the second optical member by an elastic adhesive material.

6. The head-mounted display apparatus according to claim 4, wherein
    a first surface formed at the base plate and a second surface formed at the holder pedestal face each other, and a plane obtained by extending the first surface intersects the second optical member.

7. The head-mounted display apparatus according to claim 1, wherein
the insertion opening has a size including an adjustment margin that tolerates movement of the support frame in a normal direction of a display surface of the display element.

8. The head-mounted display apparatus according to claim 2, wherein
the dust-proof structure includes a step that holds the adhesive material protruding to the base plate due to positioning of the holder, around the base plate of the holder to prevent diffusion.

9. The head-mounted display apparatus according to claim 2, wherein
the dust-proof structure includes a step that holds the adhesive material protruding to the holder pedestal due to positioning of the holder, around the holder pedestal of the case to prevent diffusion.

10. An optical unit, comprising:
a display element;
a holder configured to hold the display element;
a projection optical system configured to project an image formed on the display element; and
a case configured to house the projection optical system in a positioned state, wherein
the display element includes a plate-shaped main body and a flexible printed circuit portion coupled to an upper portion of the plate-shaped main body,
the holder includes a support frame inserted into the case through an insertion opening formed at the case while supporting the display element, and a base plate coupled to a root of the support frame,
the case includes a holder pedestal facing the base plate, and
a dust-proof structure includes an adhesive material extending along a periphery of the base plate and protruding to the holder pedestal,
wherein the display element supported by the holder is configured to be inserted into an inner space of the case from an upper side of the case via the insertion opening and be fixed in the positioned state, and
when the display element is fixed in the positioned state, the flexible printed circuit portion extends upward and out of the insertion opening, and the support frame of the holder is located in the inner space of the case and extends in parallel to the plate-shaped main body of the display element.

11. The optical unit according to claim 10, wherein the dust-proof structure is configured to achieve fixing of the holder and the case while ensuring dust-proofing of the holder and the case.

12. A manufacturing method of an optical unit in which a holder for holding a display element is fixed to a case for housing a projection optical system in a positioned state,
the display element including a plate-shaped main body and a flexible printed circuit portion coupled to an upper portion of the plate-shaped main body,
the holder including a support frame inserted into the case through an insertion opening formed at the case while supporting the display element, and a base plate coupled to a root of the support frame, the manufacturing method comprising:
inserting the display element supported by the support frame into an inner space of the case from an upper side of the case via the insertion opening formed at the case; and
fixing the base plate by an adhesive material to a holder pedestal provided near the insertion opening of the case so that the display element is fixed inside the case in the positioned state, wherein
when the display element is fixed in the positioned state, the flexible printed circuit portion extends upward and out of the insertion opening, and the support frame of the holder is located in the inner space of the case and extends in parallel to the plate-shaped main body of the display element.

* * * * *